(12) United States Patent
Elshafie et al.

(10) Patent No.: US 12,238,709 B2
(45) Date of Patent: Feb. 25, 2025

(54) INDICATING A NUMBER OF EMPTY TRANSMISSION OCCASIONS OF A GROUP OF SEMI-PERSISTENT TRANSMISSION OCCASIONS

(71) Applicant: QUALCOMM Incorporated, San Diego, CA (US)

(72) Inventors: Ahmed Elshafie, San Diego, CA (US); Yi Huang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 557 days.

(21) Appl. No.: 17/528,964

(22) Filed: Nov. 17, 2021

(65) Prior Publication Data
US 2023/0156698 A1   May 18, 2023

(51) Int. Cl.
*H04W 72/1273* (2023.01)
*H04L 1/1607* (2023.01)
*H04L 5/00* (2006.01)
*H04W 72/23* (2023.01)

(52) U.S. Cl.
CPC ....... *H04W 72/1273* (2013.01); *H04L 1/1614* (2013.01); *H04L 5/0053* (2013.01); *H04W 72/23* (2023.01)

(58) Field of Classification Search
CPC ... H04L 1/0025; H04L 1/0026; H04L 1/1614; H04L 1/1664; H04L 1/1854; H04L 1/1861; H04L 1/1893; H04L 1/1896; H04L 5/0044; H04L 5/0053; H04L 5/0055; H04L 5/0094; H04W 72/1273; H04W 72/23
See application file for complete search history.

(56) References Cited

U.S. PATENT DOCUMENTS

| | | | |
|---|---|---|---|
| 10,374,748 B2 * | 8/2019 | Oketani | H04W 72/04 |
| 11,490,411 B2 * | 11/2022 | Saber | H04L 5/0055 |
| 11,496,252 B2 * | 11/2022 | Li | H04L 1/1822 |
| 11,533,150 B2 * | 12/2022 | Shao | H04L 5/0007 |

(Continued)

FOREIGN PATENT DOCUMENTS

| | | | | |
|---|---|---|---|---|
| AU | 2019316839 B2 * | 6/2022 | | H04L 5/001 |
| CA | 3127126 A1 * | 7/2020 | | H04L 1/1812 |

(Continued)

*Primary Examiner* — Eric Nowlin
(74) *Attorney, Agent, or Firm* — Kevin M. Donnelly; Seyfarth Shaw LLP

(57) ABSTRACT

A method for wireless communication by a UE includes receiving, from a base station, DCI indicating both a semi-persistent schedule for PDSCH occasions within a transmission window and a first quantity of a first group of empty PDSCH occasions. The PDSCH occasions may include the first group of empty PDSCH occasions and a second group of non-empty PDSCH occasions. The method also includes receiving, from the base station, downlink data transmissions within the transmission window based on the semi-persistent schedule. The method further includes transmitting, to the base station, a feedback message indicating a second quantity of either a first group of NACKs associated with the first group of empty PDSCH occasions or a second group of NACKs associated with the second group of non-empty PDSCH occasions based on a total quantity of both the first group of NACKs and the second group of NACKs being greater than the first quantity.

30 Claims, 9 Drawing Sheets

(56) References Cited

U.S. PATENT DOCUMENTS

| | | | | |
|---|---|---|---|---|
| 11,706,773 | B2* | 7/2023 | Saber | H04L 5/0053 |
| | | | | 370/330 |
| 11,792,643 | B2* | 10/2023 | Elshafie | H04W 72/20 |
| | | | | 455/411 |
| 11,792,793 | B2* | 10/2023 | Elshafie | H04L 1/0025 |
| | | | | 370/329 |
| 11,895,647 | B2* | 2/2024 | Wang | H04L 1/1861 |
| 11,943,784 | B2* | 3/2024 | Elshafie | H04W 76/28 |
| 12,063,677 | B2* | 8/2024 | Elshafie | H04L 5/0055 |
| 2018/0262295 | A1* | 9/2018 | Oketani | H04W 28/065 |
| 2019/0313436 | A1* | 10/2019 | Lee | H04L 5/0051 |
| 2020/0374091 | A1* | 11/2020 | Shao | H04L 5/0055 |
| 2021/0050953 | A1* | 2/2021 | Park | H04B 7/0456 |
| 2021/0105102 | A1* | 4/2021 | Li | H04L 1/1896 |
| 2021/0112583 | A1* | 4/2021 | Gao | H04L 5/0044 |
| 2021/0153237 | A1* | 5/2021 | Saber | H04W 72/23 |
| 2021/0168834 | A1* | 6/2021 | Chen | H04L 5/001 |
| 2021/0266938 | A1* | 8/2021 | Khoshnevisan | H04L 1/1887 |
| 2021/0288757 | A1* | 9/2021 | Jacobsen | H04B 7/0456 |
| 2021/0368453 | A1* | 11/2021 | Lee | H04W 52/146 |
| 2022/0030615 | A1* | 1/2022 | Saber | H04L 5/0053 |
| 2022/0052793 | A1* | 2/2022 | Bao | H04L 1/1822 |
| 2022/0053535 | A1* | 2/2022 | Xu | H04W 72/23 |
| 2022/0095337 | A1* | 3/2022 | Wang | H04L 5/0053 |
| 2022/0124741 | A1* | 4/2022 | Elshafie | H04L 5/0094 |
| 2022/0132544 | A1* | 4/2022 | Elshafie | H04L 1/1614 |
| 2022/0330295 | A1* | 10/2022 | Ly | H04W 72/0453 |
| 2023/0069103 | A1* | 3/2023 | Awoniyi-Oteri | H04L 1/1887 |
| 2023/0076459 | A1* | 3/2023 | Si | H04L 5/0053 |
| 2023/0107584 | A1* | 4/2023 | Elshafie | H04L 5/0051 |
| | | | | 370/329 |
| 2023/0116090 | A1* | 4/2023 | Elshafie | H04W 12/037 |
| | | | | 455/411 |
| 2023/0171040 | A1* | 6/2023 | Gao | H04L 5/0055 |
| | | | | 370/329 |
| 2023/0179339 | A1* | 6/2023 | Jacobsen | H04W 72/0446 |
| | | | | 370/329 |
| 2023/0217435 | A1* | 7/2023 | Gao | H04L 27/2662 |
| | | | | 370/329 |
| 2023/0239077 | A1* | 7/2023 | Gerami | H04W 72/1273 |
| | | | | 370/329 |
| 2023/0300816 | A1* | 9/2023 | Guo | H04L 1/1822 |
| | | | | 370/329 |
| 2023/0319822 | A1* | 10/2023 | Park | H04W 72/232 |
| | | | | 370/329 |
| 2023/0319843 | A1* | 10/2023 | Lei | H04L 5/0091 |
| | | | | 370/329 |

FOREIGN PATENT DOCUMENTS

| | | | | | |
|---|---|---|---|---|---|
| CN | 113993221 | A | * | 1/2022 | H04L 5/001 |
| EP | 3745624 | A1 | * | 12/2020 | H04L 1/1854 |
| EP | 3823191 | A1 | * | 5/2021 | H04L 1/1607 |
| EP | 3836679 | A1 | * | 6/2021 | H04L 5/001 |
| EP | 3945743 | A1 | * | 2/2022 | H04L 5/001 |
| EP | 3965332 | A1 | * | 3/2022 | H04L 1/1812 |
| EP | 3965343 | A1 | * | 3/2022 | H04L 1/1607 |
| EP | 4109797 | A1 | * | 12/2022 | H04L 1/1607 |
| EP | 3945743 | B1 | * | 2/2023 | H04L 5/001 |
| EP | 3745624 | B1 | * | 3/2023 | H04L 1/1854 |
| EP | 4164155 | A1 | * | 4/2023 | H04L 1/1854 |
| EP | 4236542 | A2 | * | 8/2023 | H04L 1/08 |
| EP | 3823191 | B1 | * | 10/2023 | H04L 1/1607 |
| JP | 2021513820 | A | * | 5/2021 | |
| JP | 7032576 | B2 | * | 3/2022 | H04L 1/1854 |
| KR | 20220014799 | A | * | 2/2022 | |
| KR | 20230029770 | A | * | 3/2023 | |
| TW | 202205900 | A | * | 2/2022 | |
| WO | WO-2019157920 | A1 | * | 8/2019 | |
| WO | WO-2020197195 | A1 | * | 10/2020 | |
| WO | WO-2021161060 | A1 | * | 8/2021 | |
| WO | WO-2021168201 | A1 | * | 8/2021 | |
| WO | WO-2021180422 | A1 | * | 9/2021 | |
| WO | WO-2021211051 | A1 | * | 10/2021 | |
| WO | WO-2022005263 | A1 | * | 1/2022 | |
| WO | WO-2022086961 | A1 | * | 4/2022 | H04L 1/1819 |
| WO | WO-2023027941 | A1 | * | 3/2023 | H04L 1/1819 |
| WO | WO-2023055493 | A1 | * | 4/2023 | H04L 5/0044 |
| WO | WO-2024030415 | A1 | * | 2/2024 | |

\* cited by examiner

INDICATING A NUMBER OF EMPTY TRANSMISSION OCCASIONS OF A GROUP OF SEMI-PERSISTENT TRANSMISSION OCCASIONS

FIELD OF THE DISCLOSURE

Aspects of the present disclosure generally relate to wireless communications, and more particularly to indicating a number of empty transmission occasions of a group of semi-persistent transmission occasions.

BACKGROUND

Wireless communications systems are widely deployed to provide various telecommunications services such as telephony, video, data, messaging, and broadcasts. Typical wireless communications systems may employ multiple-access technologies capable of supporting communications with multiple users by sharing available system resources (for example, bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and long term evolution (LTE). LTE/LTE-Advanced is a set of enhancements to the universal mobile telecommunications system (UMTS) mobile standard promulgated by the Third Generation Partnership Project (3GPP).

A wireless communications network may include a number of base stations (BSs) that can support communications for a number of user equipment (UEs). A user equipment (UE) may communicate with a base station (BS) via the downlink and uplink. The downlink (or forward link) refers to the communications link from the BS to the UE, and the uplink (or reverse link) refers to the communications link from the UE to the BS. As will be described in more detail, a BS may be referred to as a Node B, a gNB, an access point (AP), a radio head, a transmit and receive point (TRP), a new radio (NR) BS, a 5G Node B, and/or the like.

The above multiple access technologies have been adopted in various telecommunications standards to provide a common protocol that enables different user equipment to communicate on a municipal, national, regional, and even global level. New radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (for example, also known as discrete Fourier transform spread OFDM (DFT-s-OFDM)) on the uplink (UL), as well as supporting beamforming, multiple-input multiple-output (MIMO) antenna technology, and carrier aggregation.

In a wireless communication system, scheduling is a process in which a first device, such as a base station, allocates transmission resources to a second device, such as a UE. The transmission resources may include uplink resources or downlink resources. In some examples, the scheduling may be dynamic. In such examples, in each subframe, the base station may transmit a grant for transmission resources via a control channel. The dynamic scheduling may provide flexibility in assigning resources to the UE at a cost of transmitting the grant on the control channel in each subframe. In other examples, the scheduling may be persistent or semi-persistent. In such examples, the control channel overhead may be too high given the number of UEs. Therefore, in some such examples, the base station may allocate all of the transmission resources at once, rather than dynamically allocating the transmission resources in each subframe. In such examples, the allocated transmission resources may be configured with a periodicity that defines a time between two transmission occasions.

SUMMARY

In one aspect of the present disclosure, a method for wireless communication is disclosed. The method includes receiving, from a base station, downlink control information (DCI) indicating both a semi-persistent schedule for physical downlink shared channel (PDSCH) occasions within a transmission window and a first quantity of a first group of empty PDSCH occasions. The PDSCH occasions include the first group of empty PDSCH occasions and a second group of non-empty PDSCH occasions. The method also includes receiving, from the base station, downlink data transmissions within the transmission window based on the semi-persistent schedule. Each downlink data transmission being received in a respective non-empty PDSCH occasion of the second group of non-empty PDSCH occasions. The method further includes transmitting, to the base station after the transmission window, a feedback message indicating a second quantity of either a first group of negative acknowledgements (NACKs) associated with the first group of empty PDSCH occasions or a second group of NACKs associated with the second group of non-empty PDSCH occasions based on a total quantity of both the first group of NACKs and the second group of NACKs being greater than the first quantity. The method still further includes transmitting, to the base station after the transmission window, each NACK of one or both of the first group of NACKs or the second group of NACKs.

Another aspect of the present disclosure is directed to an apparatus including means for receiving, from a base station, DCI indicating both a semi-persistent schedule for PDSCH occasions within a transmission window and a first quantity of a first group of empty PDSCH occasions. The PDSCH occasions include the first group of empty PDSCH occasions and a second group of non-empty PDSCH occasions. The apparatus also includes means for receiving, from the base station, downlink data transmissions within the transmission window based on the semi-persistent schedule. Each downlink data transmission being received in a respective non-empty PDSCH occasion of the second group of non-empty PDSCH occasions. The apparatus further includes means for transmitting, to the base station after the transmission window, a feedback message indicating a second quantity of either a first group of NACKs associated with the first group of empty PDSCH occasions or a second group of NACKs associated with the second group of non-empty PDSCH occasions based on a total quantity of both the first group of NACKs and the second group of NACKs being greater than the first quantity. The apparatus still further includes means for transmitting, to the base station after the transmission window, each NACK of one or both of the first group of NACKs or the second group of NACKs.

In another aspect of the present disclosure, a non-transitory computer-readable medium with non-transitory program code recorded thereon is disclosed. The program code is for wireless communication at a user equipment (UE). The program code is executed by a processor and includes program code to receive, from a base station, DCI indicating both a semi-persistent schedule for PDSCH occasions within a transmission window and a first quantity of a first group of empty PDSCH occasions. The PDSCH occasions include the first group of empty PDSCH occasions and a second group of non-empty PDSCH occasions. The program code also includes program code to receive, from the base station, downlink data transmissions within the transmission window based on the semi-persistent schedule. Each downlink data transmission being received in a respective non-empty PDSCH occasion of the second group of non-empty PDSCH occasions. The program code further includes program code to transmit, to the base station after the transmission window, a feedback message indicating a second quantity of either a first group of NACKs associated with the first group of empty PDSCH occasions or a second group of NACKs associated with the second group of non-empty PDSCH occasions based on a total quantity of both the first group of NACKs and the second group of NACKs being greater than the first quantity. The program code still further includes program code to transmit, to the base station after the transmission window, each NACK of one or both of the first group of NACKs or the second group of NACKs.

Another aspect of the present disclosure is directed to an apparatus. The apparatus having a memory, one or more processors coupled to the memory, and instructions stored in the memory. The instructions being operable, when executed by the processor, to cause the apparatus to receive, from a base station, DCI indicating both a semi-persistent schedule for PDSCH occasions within a transmission window and a first quantity of a first group of empty PDSCH occasions. The PDSCH occasions include the first group of empty PDSCH occasions and a second group of non-empty PDSCH occasions. Execution of the instructions also cause the apparatus to receive, from the base station, downlink data transmissions within the transmission window based on the semi-persistent schedule. Each downlink data transmission being received in a respective non-empty PDSCH occasion of the second group of non-empty PDSCH occasions. Execution of the instructions additionally cause the apparatus to transmit, to the base station after the transmission window, a feedback message indicating a second quantity of either a first group of NACKs associated with the first group of empty PDSCH occasions or a second group of NACKs associated with the second group of non-empty PDSCH occasions based on a total quantity of both the first group of NACKs and the second group of NACKs being greater than the first quantity. Execution of the instructions further cause the apparatus to transmit, to the base station after the transmission window, each NACK of one or both of the first group of NACKs or the second group of NACKs.

In one aspect of the present disclosure, a method for wireless communication by a first wireless device is disclosed. The method includes receiving, from a second wireless device, a transmission configuration message configuring transmission occasions from the first wireless device to the second wireless device within a transmission window. The method also includes transmitting, to the second wireless device, a transmission occasion message indicating a first quantity of a first group of empty transmission occasions of the transmission occasions that include the first group of empty transmission occasions and a second group of non-empty transmission occasions. The method further includes transmitting, to the second wireless device, transmissions within the transmission window. Each transmission being transmitted in a respective non-empty transmission occasion of the second group of non-empty transmission occasions. The method still further includes receiving, from the second wireless device after the transmission window, a feedback message indicating a second quantity of either a first group of NACKs associated with the first group of empty PDSCH occasions or a second group of NACKs associated with the second group of non-empty PDSCH occasions based on a total quantity of both the first group of NACKs and the second group of NACKs being greater than the first quantity. The method also includes receiving, from the second wireless device, each NACK of one or both of the first group of NACKs or the second group of NACKs.

Another aspect of the present disclosure is directed to an apparatus including means for receiving, from a second wireless device, a transmission configuration message configuring transmission occasions from the first wireless device to the second wireless device within a transmission window. The apparatus also includes means for transmitting, to the second wireless device, a transmission occasion message indicating a first quantity of a first group of empty transmission occasions of the transmission occasions that include the first group of empty transmission occasions and a second group of non-empty transmission occasions. The apparatus still further includes means for transmitting, to the second wireless device, transmissions within the transmission window. Each transmission being transmitted in a respective non-empty transmission occasion of the second group of non-empty transmission occasions. The apparatus also includes means for receiving, from the second wireless device after the transmission window, a feedback message indicating a second quantity of either a first group of NACKs associated with the first group of empty PDSCH occasions or a second group of NACKs associated with the second group of non-empty PDSCH occasions based on a total quantity of both the first group of NACKs and the second group of NACKs being greater than the first quantity. The apparatus further includes means for receiving, from the second wireless device, each NACK of one or both of the first group of NACKs or the second group of NACKs.

In another aspect of the present disclosure, a non-transitory computer-readable medium with non-transitory program code recorded thereon is disclosed. The program code is for wireless communication at a first wireless device. The program code is executed by a processor and includes program code to receive, from a second wireless device, a transmission configuration message configuring transmission occasions from the first wireless device to the second wireless device within a transmission window. The program code also includes program code to transmit, to the second wireless device, a transmission occasion message indicating a first quantity of a first group of empty transmission occasions of the transmission occasions that include the first group of empty transmission occasions and a second group of non-empty transmission occasions. The program code further includes program code to transmit, to the second wireless device, transmissions within the transmission window. Each transmission being transmitted in a respective non-empty transmission occasion of the second group of non-empty transmission occasions. The program code still further includes program code to receive, from the second wireless device after the transmission window, a feedback message indicating a second quantity of either a first group of NACKs associated with the first group of empty PDSCH occasions or a second group of NACKs associated with the second group of non-empty PDSCH occasions based on a total quantity of both the first group of NACKs and the second group of NACKs being greater than the first quantity. The program code also includes program code to receive, from the second wireless device, each NACK of one or both of the first group of NACKs or the second group of NACKs.

Another aspect of the present disclosure is directed to an apparatus. The apparatus having a memory, one or more processors coupled to the memory, and instructions stored in the memory. The instructions being operable, when executed by the processor, to cause the apparatus to receive, from a second wireless device, a transmission configuration message configuring transmission occasions from the first wireless device to the second wireless device within a transmission window. Execution of the instructions also cause the apparatus to transmit, to the second wireless device, a transmission occasion message indicating a first quantity of a first group of empty transmission occasions of the transmission occasions that include the first group of empty transmission occasions and a second group of non-empty transmission occasions. Execution of the instructions additionally cause the apparatus to transmit, to the second wireless device, transmissions within the transmission window. Each transmission being transmitted in a respective non-empty transmission occasion of the second group of non-empty transmission occasions. Execution of the instructions further cause the apparatus to receive, from the second wireless device after the transmission window, a feedback message indicating a second quantity of either a first group of NACKs associated with the first group of empty PDSCH occasions or a second group of NACKs associated with the second group of non-empty PDSCH occasions based on a total quantity of both the first group of NACKs and the second group of NACKs being greater than the first quantity. Execution of the instructions still cause the apparatus to receive, from the second wireless device, each NACK of one or both of the first group of NACKs or the second group of NACKs.

Aspects generally include a method, apparatus, system, computer program product, non-transitory computer-readable medium, user equipment, base station, wireless communications device, and processing system as substantially described with reference to and as illustrated by the accompanying drawings and specification.

The foregoing has outlined rather broadly the features and technical advantages of examples according to the disclosure in order that the detailed description that follows may be better understood. Additional features and advantages will be described. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that features of the present disclosure can be understood in detail, a particular description may be had by reference to aspects, some of which are illustrated in the appended drawings. It is to be noted, however, that the appended drawings illustrate only certain aspects of this disclosure and are therefore not to be considered limiting of its scope, for the description may admit to other equally effective aspects. The same reference numbers in different drawings may identify the same or similar elements.

DETAILED DESCRIPTION

Figure 1:
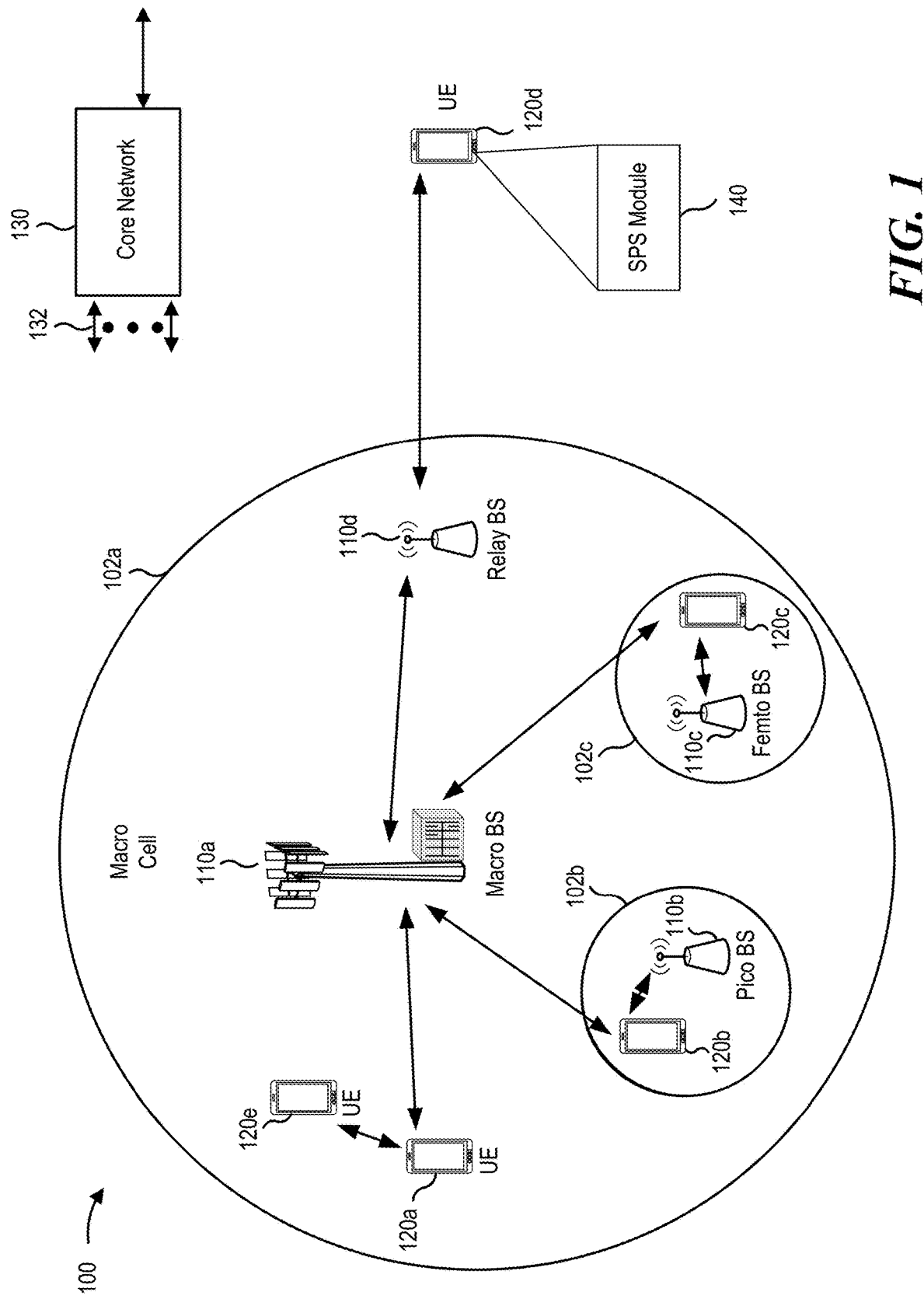
FIG. 1 is a block diagram conceptually illustrating an example of a wireless communications network, in accordance with various aspects of the present disclosure.

Various aspects of the disclosure are described more fully below with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings, one skilled in the art should appreciate that the scope of the disclosure is intended to cover any aspect of the disclosure, whether implemented independently of or combined with any other aspect of the disclosure. For example, an apparatus may be implemented or a method may be practiced using any number of the aspects set forth. In addition, the scope of the disclosure is intended to cover such an apparatus or method, which is practiced using other structure, functionality, or structure and functionality in addition to or other than the various aspects of the disclosure set forth. It should be understood that any aspect of the disclosure disclosed may be embodied by one or more elements of a claim.

Several aspects of telecommunications systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

In a wireless communication system, scheduling is a process in which a first device, such as a base station, allocates transmission resources to a second device, such as a user equipment (UE). The transmission resources may include uplink resources or downlink resources. In some examples, the scheduling may be dynamic. In such examples, in each subframe, the base station may transmit a grant for transmission resources via a control channel. The dynamic scheduling may provide flexibility in assigning resources to the UE at a cost of transmitting a grant on the control channel in each subframe. In such examples, the transmission of the grant in each subframe may increase control channel overhead. Therefore, in some other examples, persistent scheduling or semi-persistent scheduling may be used to reduce the control channel overhead. In such examples, the base station may allocate all of the transmission resources at once and the allocated transmission resources may be configured with a periodicity that defines a time between adjacent transmission occasions.

As discussed, some wireless communication systems may use a semi-persistent scheduling (SPS) scheme. In some such wireless communication systems, a base station may target a certain success rate for SPS transmissions, such as SPS physical downlink shared channel (PDSCH) transmissions. In some examples, the success rate may be equal to or greater than ninety percent. The base station may implement base station link adaptation, power control, or rate adaptation to achieve the success rate. Achieving the targeted success rate for SPS transmissions may increase a number of acknowledgement (ACK) transmissions and decrease a number of negative acknowledgement (NACK) transmissions, where an ACK or a NACK is transmitted in response to each SPS transmission. In such examples, network overhead may be reduced by using a NACK-only feedback scheme instead of an ACK and NACK feedback scheme because the number of NACKs is less than the number of ACKs.

A number of data transmissions between a base station and a UE may correspond to an amount of network traffic. In some examples, a reduction in the network traffic may result in a reduced number of data transmissions, such as SPS transmissions, between the base station and the UE within a given transmission window. In such examples, due to the reduction in the network traffic, the base station may not have data to transmit at one or more SPS transmission occasions. Such SPS transmission occasions may be considered empty SPS transmission occasions. In some examples, during a period of reduced network traffic, the number of empty SPS transmission occasions may be greater than a number of non-empty SPS transmission occasions. In such examples, a number of feedback transmissions (for example, NACK transmissions) associated with a NACK-only feedback scheme is greater than a number of feedback transmissions (for example, ACK transmissions) associated with an ACK-only feedback scheme because, a receiving device, such as the UE, transmits a NACK for each empty SPS transmission occasion. Thus, in such examples, when using the NACK-only feedback scheme, the increase in the number of NACK transmissions may increase network overhead.

Various aspects disclosed relate generally to an SPS feedback scheme for transmission windows having one or more empty SPS transmission occasions. In some aspects, a base station transmits, to a UE, an indication of a number of empty SPS transmission occasions in a transmission window. In some aspects, the UE may then selectively transmit an indication of a number of NACKs associated with a group of SPS transmissions based on the indicated number of SPS transmission occasions being less than the number of NACKs. In some examples, the UE may receive, from the base station, downlink control information (DCI) indicating a semi-persistent schedule for SPS transmission occasions within the transmission window. The SPS transmission occasions may be physical downlink shared channel (PDSCH) occasions. The SPS transmission occasions include the empty SPS transmission occasions as well as non-empty SPS transmission occasions. In some examples, it is the DCI that indicates the number of empty SPS transmission occasions. After receiving the DCI, the UE may then receive SPS transmissions within the transmission window based on the semi-persistent schedule for SPS transmission occasions. Each SPS transmission is received in a respective one of the non-empty SPS transmission occasions.

The UE may determine that all non-empty SPS transmissions were successfully received within the transmission window if a total number of NACKs generated during the transmission window is equal to a total number of empty SPS transmission occasions within the transmission window. Alternatively, the UE may determine that one or more SPS transmissions were unsuccessfully received within the transmission window if the total number of NACKs generated during the transmission window is greater than the number of empty SPS transmission occasions. Additionally, or alternatively, the UE may identify an error associated with one or more empty SPS occasions if the total number of NACKs generated during the transmission window is greater than the number of empty SPS transmission occasions. In such examples, the UE may transmit a feedback message to the base station that indicates a number of NACKs in a group of NACKs associated with one or both of the non-empty SPS transmission occasions or the empty SPS transmission occasions within the transmission window based on the total number of NACKs generated within the transmission window being greater than the number of empty SPS transmission occasions. Based on transmitting the feedback message, the UE may also transmit, to the base station, the group of NACKs associated with one or both of the non-empty SPS transmission occasions or the empty SPS transmission occasions. In some examples, the number of NACKs may be the number of NACKs for empty SPS transmission occasions. In some other examples, the number of NACKs may be the number of NACKs for only non-empty SPS transmission occasions. Based on the indicated number of NACKs, the base station may then adjust one or more transmission parameters.

Particular aspects of the subject matter described in this disclosure may be implemented to realize one or more of the following potential advantages. In some examples, the described techniques may reduce network overhead for NACK-only feedback schemes by limiting feedback message transmissions to instances in which one or more non-empty SPS transmissions were unsuccessfully received within a transmission window. In such examples, the UE may reduce an amount of feedback message transmissions by refraining from transmitting feedback messages when all non-empty SPS transmissions are successfully received within the transmission window (for example, when the total number of NACKs associated with the empty SPS transmission occasions and the non-empty SPS transmissions occasions within the transmission window equal the indicated number of empty SPS transmission occasions within the transmission window).

FIG. 1 is a diagram illustrating a network 100 in which aspects of the present disclosure may be practiced. The network 100 may be a 5G or NR network or some other wireless network, such as an LTE network. The wireless network 100 may include a number of BSs 110 (shown as BS 110a, BS 110b, BS 110c, and BS 110d) and other network entities. A BS is an entity that communicates with user equipment (UEs) and may also be referred to as a base station, an NR BS, a Node B, a gNB, a 5G node B (NB), an access point, a transmit and receive point (TRP), and/or the like. Each BS may provide communications coverage for a particular geographic area. In 3GPP, the term "cell" can refer to a coverage area of a BS and/or a BS subsystem serving this coverage area, depending on the context in which the term is used.

A BS may provide communications coverage for a macro cell, a pico cell, a femto cell, and/or another type of cell. A macro cell may cover a relatively large geographic area (for example, several kilometers in radius) and may allow unrestricted access by UEs with service subscription. A pico cell may cover a relatively small geographic area and may allow unrestricted access by UEs with service subscription. A femto cell may cover a relatively small geographic area (for example, a home) and may allow restricted access by UEs having association with the femto cell (for example, UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (for example, three) cells. The terms "eNB," "base station," "NR BS," "gNB," "TRP," "AP," "node B," "5G NB," and "cell" may be used interchangeably.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces such as a direct physical connection, a virtual network, and/or the like using any suitable transport network.

The wireless network 100 may also include relay stations. A relay station is an entity that can receive a transmission of data from an upstream station (for example, a BS or a UE) and send a transmission of the data to a downstream station (for example, a UE or a BS). A relay station may also be a UE that can relay transmissions for other UEs. In the example shown in FIG. 1, a relay station 110d may communicate with macro BS 110a and a UE 120d in order to facilitate communications between the BS 110a and UE 120d. A relay station may also be referred to as a relay BS, a relay base station, a relay, and/or the like.

The wireless network 100 may be a heterogeneous network that includes BSs of different types, for example, macro BSs, pico BSs, femto BSs, relay BSs, and/or the like. These different types of BSs may have different transmit power levels, different coverage areas, and different impact on interference in the wireless network 100. For example, macro BSs may have a high transmit power level (for example, 5 to 40 Watts) whereas pico BSs, femto BSs, and relay BSs may have lower transmit power levels (for example, 0.1 to 2 Watts).

As an example, the BSs 110 (shown as BS 110a, BS 110b, BS 110c, and BS 110d) and the core network 130 may exchange communications via backhaul links 132 (for example, S1, etc.). Base stations 110 may communicate with one another over other backhaul links (for example, X2, etc.) either directly or indirectly (for example, through core network 130).

The core network 130 may be an evolved packet core (EPC), which may include at least one mobility management entity (MME), at least one serving gateway (S-GW), and at least one packet data network (PDN) gateway (P-GW). The MME may be the control node that processes the signaling between the UEs 120 and the EPC. All user IP packets may be transferred through the S-GW, which itself may be connected to the P-GW. The P-GW may provide IP address allocation as well as other functions. The P-GW may be connected to the network operator's IP services. The operator's IP services may include the Internet, the Intranet, an IP multimedia subsystem (IMS), and a packet-switched (PS) streaming service.

The core network 130 may provide user authentication, access authorization, tracking, IP connectivity, and other access, routing, or mobility functions. One or more of the base stations 110 or access node controllers (ANCs) may interface with the core network 130 through backhaul links 132 (for example, S1, S2, etc.) and may perform radio configuration and scheduling for communications with the UEs 120. In some configurations, various functions of each access network entity or base station 110 may be distributed across various network devices (for example, radio heads and access network controllers) or consolidated into a single network device (for example, a base station 110).

UEs 120 (for example, 120a, 120b, 120c) may be dispersed throughout the wireless network 100, and each UE may be stationary or mobile. A UE may also be referred to as an access terminal, a terminal, a mobile station, a subscriber unit, a station, and/or the like. A UE may be a cellular phone (for example, a smart phone), a personal digital assistant (PDA), a wireless modem, a wireless communications device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (for example, smart ring, smart bracelet)), an entertainment device (for example, a music or video device, or a satellite radio), a vehicular component or sensor, smart meters/sensors, industrial manufacturing equipment, a global positioning system device, or any other suitable device that is configured to communicate via a wireless or wired medium.

One or more UEs 120 may establish a protocol data unit (PDU) session for a network slice. In some cases, the UE 120 may select a network slice based on an application or subscription service. By having different network slices serving different applications or subscriptions, the UE 120 may improve its resource utilization in the wireless network 100, while also satisfying performance specifications of individual applications of the UE 120. In some cases, the network slices used by UE 120 may be served by an AMF (not shown in FIG. 1) associated with one or both of the base station 110 or core network 130. In addition, session management of the network slices may be performed by an access and mobility management function (AMF).

The UEs 120 may include an SPS module 140. For brevity, only one UE 120*d* is shown as including the SPS module 140. The SPS module 140 may receive, from a base station 110, DCI indicating both a semi-persistent schedule for PDSCH occasions within a transmission window and a first quantity of a first group of empty PDSCH occasions, the number of PDSCH occasions comprising the first group of empty PDSCH occasions and a second group of non-empty PDSCH occasions; receive, from the base station 110, a number of downlink data transmissions within the transmission window based on the semi-persistent schedule; transmit, to the base station 110 after the transmission window, a feedback message indicating a second quantity of either a first group of NACKs associated with the first group of empty PDSCH occasions or a second group of NACKs associated with the second group of non-empty PDSCH occasions based on a total quantity of both the first group of NACKs and the second group of NACKs being greater than the first quantity; and transmit, to the base station 110 after the transmission window, each NACK of one or both of the first group of NACKs or the second group of NACKs. Although not shown in FIG. 1, the base station 110 may include an SPS module for performing functions that correspond to the functions of the SPS module 140.

Some UEs may be considered machine-type communications (MTC) or evolved or enhanced machine-type communications (eMTC) UEs. MTC and eMTC UEs include, for example, robots, drones, remote devices, sensors, meters, monitors, location tags, and/or the like, that may communicate with a base station, another device (for example, remote device), or some other entity. A wireless node may provide, for example, connectivity for or to a network (for example, a wide area network such as Internet or a cellular network) via a wired or wireless communications link. Some UEs may be considered Internet-of-Things (IoT) devices, and/or may be implemented as NB-IoT (narrowband internet of things) devices. Some UEs may be considered a customer premises equipment (CPE). UE 120 may be included inside a housing that houses components of UE 120, such as processor components, memory components, and/or the like.

In general, any number of wireless networks may be deployed in a given geographic area. Each wireless network may support a particular radio access technology (RAT) and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (for example, shown as UE 120*a* and UE 120*e*) may communicate directly using one or more sidelink channels (for example, without using a base station 110 as an intermediary to communicate with one another). For example, the UEs 120 may communicate using peer-to-peer (P2P) communications, device-to-device (D2D) communications, a vehicle-to-everything (V2X) protocol (for example, which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere as being performed by the base station 110. For example, the base station 110 may configure a UE 120 via downlink control information (DCI), radio resource control (RRC) signaling, a media access control-control element (MAC-CE) or via system information (for example, a system information block (SIB).

Figure 2:
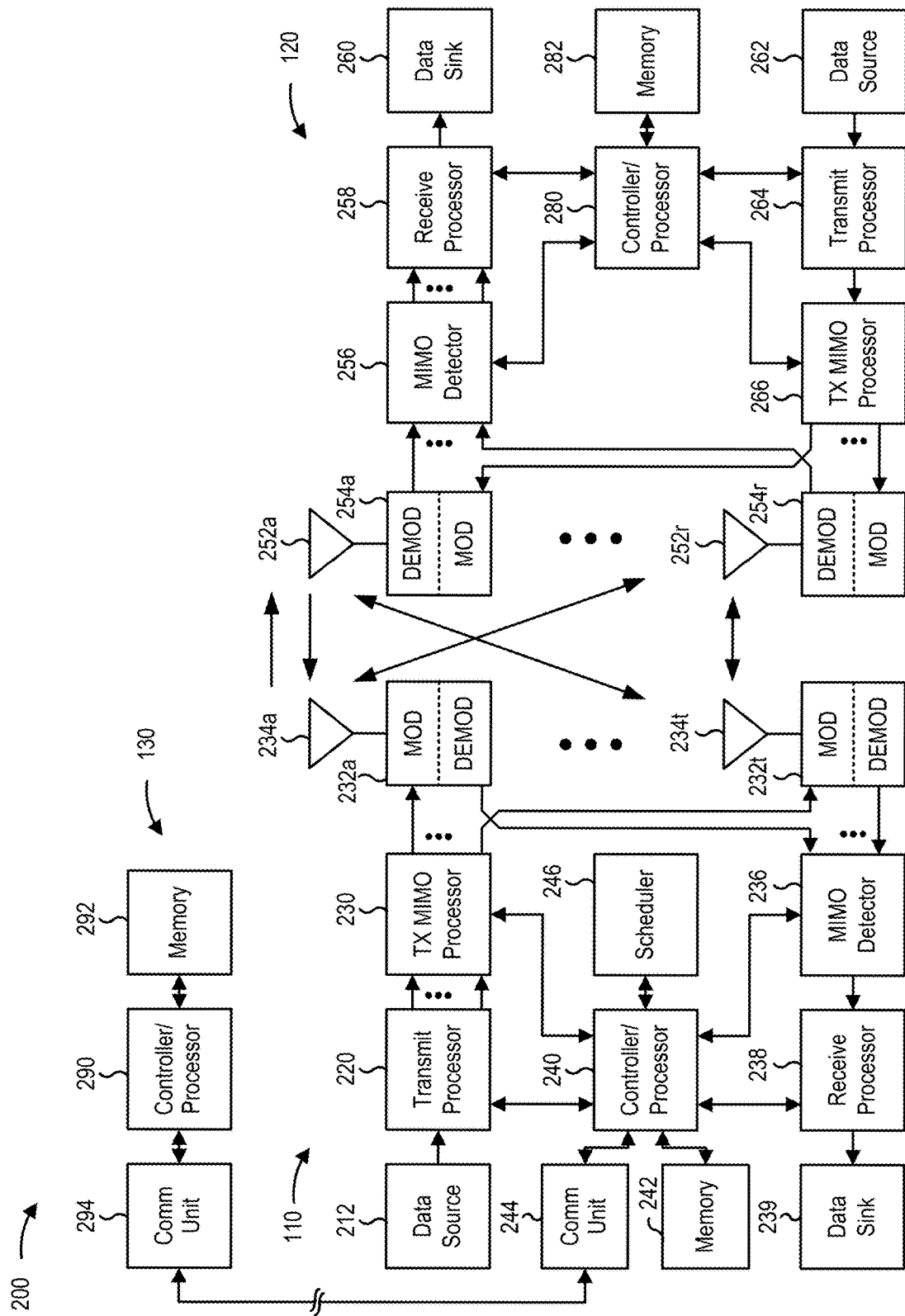
FIG. 2 is a block diagram conceptually illustrating an example of a base station in communication with a user equipment (UE) in a wireless communications network, in accordance with various aspects of the present disclosure.

FIG. 2 shows a block diagram of a design 200 of the base station 110 and UE 120, which may be one of the base stations and one of the UEs in FIG. 1. The base station 110 may be equipped with T antennas 234*a* through 234*t*, and UE 120 may be equipped with R antennas 252*a* through 252*r*, where in general T≥1 and R≥1.

At the base station 110, a transmit processor 220 may receive data from a data source 212 for one or more UEs, select one or more modulation and coding schemes (MCS) for each UE based at least in part on channel quality indicators (CQIs) received from the UE, process (for example, encode and modulate) the data for each UE based at least in part on the MCS(s) selected for the UE, and provide data symbols for all UEs. Decreasing the MCS lowers throughput but increases reliability of the transmission. The transmit processor 220 may also process system information (for example, for semi-static resource partitioning information (SRPI) and/or the like) and control information (for example, CQI requests, grants, upper layer signaling, and/or the like) and provide overhead symbols and control symbols. The transmit processor 220 may also generate reference symbols for reference signals (for example, the cell-specific reference signal (CRS)) and synchronization signals (for example, the primary synchronization signal (PSS) and secondary synchronization signal (SSS)). A transmit (TX) multiple-input multiple-output (MIMO) processor 230 may perform spatial processing (for example, precoding) on the data symbols, the control symbols, the overhead symbols, and/or the reference symbols, if applicable, and may provide T output symbol streams to T modulators (MODs) 232*a* through 232*t*. Each modulator 232 may process a respective output symbol stream (for example, for OFDM and/or the like) to obtain an output sample stream. Each modulator 232 may further process (for example, convert to analog, amplify, filter, and upconvert) the output sample stream to obtain a downlink signal. T downlink signals from modulators 232*a* through 232*t* may be transmitted via T antennas 234*a* through 234*t*, respectively. According to various aspects described in more detail below, the synchronization signals can be generated with location encoding to convey additional information.

At the UE 120, antennas 252*a* through 252*r* may receive the downlink signals from the base station 110 and/or other base stations and may provide received signals to demodulators (DEMODs) 254*a* through 254*r*, respectively. Each demodulator 254 may condition (for example, filter, amplify, downconvert, and digitize) a received signal to obtain input samples. Each demodulator 254 may further process the input samples (for example, for OFDM and/or the like) to obtain received symbols. A MIMO detector 256 may obtain received symbols from all R demodulators 254*a* through 254*r*, perform MIMO detection on the received symbols if applicable, and provide detected symbols. A receive processor 258 may process (for example, demodulate and decode) the detected symbols, provide decoded data for the UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like. In some aspects, one or more components of the UE 120 may be included in a housing.

On the uplink, at the UE 120, a transmit processor 264 may receive and process data from a data source 262 and control information (for example, for reports comprising RSRP, RSSI, RSRQ, CQI, and/or the like) from the controller/processor 280. Transmit processor 264 may also generate reference symbols for one or more reference signals. The symbols from the transmit processor 264 may be precoded by a TX MIMO processor 266 if applicable, further processed by modulators 254a through 254r (for example, for DFT-s-OFDM, CP-OFDM, and/or the like), and transmitted to the base station 110. At the base station 110, the uplink signals from the UE 120 and other UEs may be received by the antennas 234, processed by the demodulators 254, detected by a MIMO detector 236 if applicable, and further processed by a receive processor 238 to obtain decoded data and control information sent by the UE 120. The receive processor 238 may provide the decoded data to a data sink 239 and the decoded control information to a controller/processor 240. The base station 110 may include communications unit 244 and communicate to the core network 130 via the communications unit 244. The core network 130 may include a communications unit 294, a controller/processor 290, and a memory 292.

The controller/processor 240 of the base station 110, the controller/processor 280 of the UE 120, and/or any other component(s) of FIG. 2 may perform one or more techniques associated with polar code encoding as described in more detail elsewhere. For example, the controller/processor 240 of the base station 110, the controller/processor 280 of the UE 120, and/or any other component(s) of FIG. 2 may perform or direct operations of, for example, the processes of FIGS. 12 and 13 and/or other processes as described. Memories 242 and 282 may store data and program codes for the base station 110 and UE 120, respectively. A scheduler 246 may schedule UEs for data transmission on the downlink and/or uplink.

As discussed, some wireless communication systems may use a semi-persistent scheduling (SPS) scheme for uplink transmissions or downlink transmissions. In some examples, RRC signaling may configure SPS periodicity and feedback resources, such as hybrid automatic repeat request (HARQ) feedback resources. The SPS periodicity defines an amount of time between adjacent SPS occasions. The feedback resources may specify an uplink control channel grant corresponding to a time slot. Each SPS occasion may be associated with an uplink control channel grant, and HARQ feedback, such as an ACK or a NACK, may be transmitted based on the uplink control channel grant.

In some wireless communication systems, SPS may be activated via an activation DCI or reactivation DCI. In some examples, a base station may use an activation DCI to activate SPS occasions associated with an SPS configuration. Additionally, the activation DCI may indicate SPS transmission parameters, such as one or more of a modulation and coding scheme (MCS), resource block (RB) allocation, or antenna ports associated with the SPS transmissions. The reactivation DCI may adjust one or more of the SPS transmission parameters configured via the activation DCI. Additionally, a release DCI may deactivate the SPS occasions associated with the SPS configuration.

In some wireless communication systems, a base station may target a certain success rate for SPS transmissions, such as SPS physical downlink shared channel (PDSCH) transmissions. The success rate may be equal to or greater than ninety percent. In some examples, the success rate may be achieved by specifying one or more of base station link adaptation, power control, or rate adaptation. The targeted success rate for SPS transmissions may increase a number of acknowledgement (ACK) transmissions and decrease a number of negative acknowledgement (NACK) transmissions. In such examples, a receiving device, such as a UE, may transmit a respective ACK or a respective NACK for each SPS transmission. Network overhead may be reduced by limiting a number of ACK and NACK transmissions. In some examples, network overhead may be reduced by using a NACK-only feedback scheme instead of an ACK and NACK feedback scheme, where the UE only transmits NACKs in the NACK-only feedback scheme. Still, in some examples, a reduction in network traffic may reduce a number of SPS transmissions within a transmission window, such that one or more SPS transmission occasions within the transmission window may be empty SPS transmission occasions. In such examples, a receiving device, such as a UE, may transmit a NACK for an empty SPS transmission occasion. Because each empty SPS transmission occasion may be associated with a NACK transmission, a number of NACK transmissions may be greater than a number of ACK transmissions based on the increase in the number of empty SPS transmission occasions. Thus, for the NACK-only feedback scheme, an increased number of empty SPS transmission occasions may increase network overhead based on an increase in a number of NACK transmissions. For ease of explanation, SPS transmission occasions may also be referred to as SPS occasions.

Figure 3A:
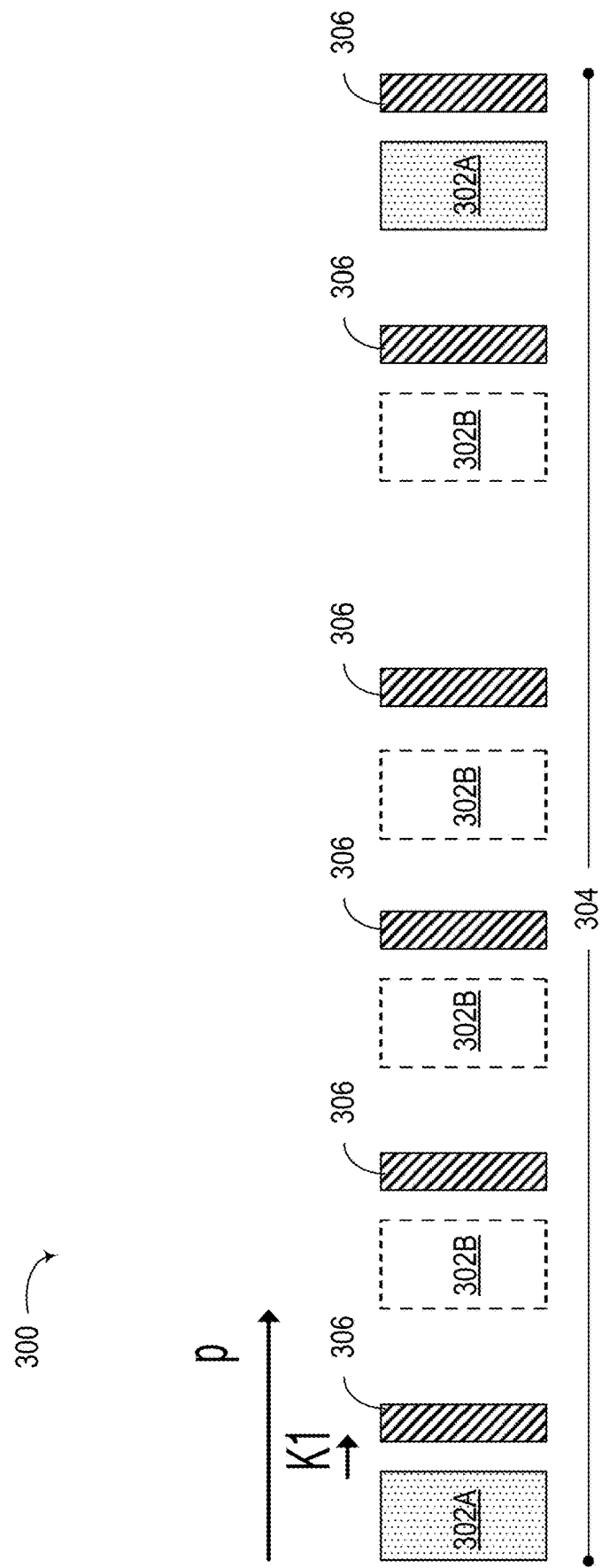
FIG. 3A is a block diagram illustrating an example of semi-persistent scheduling (SPS) transmission occasions during a low traffic period.

FIG. 3A is a block diagram illustrating an example 300 of SPS transmission occasions 302A and 302B during a low traffic period. In FIG. 3A, a base station, such as a base station 110 described with reference to FIGS. 1 and 2, may transmit an activation DCI or reactivation DCI to a UE, such as a UE 120 described with reference to FIGS. 1 and 2. The activation DCI or reactivation DCI may indicate SPS parameters associated with SPS occasions 302A and 302B. The SPS occasions 302A and 302B may be activated based on the activation DCI. In some examples, the SPS parameters may indicate a periodicity p that defines a time between two adjacent SPS occasions of the multiple SPS occasions 302A and 302B within a transmission window 304. The UE may determine a number of SPS occasions 302A and 302B based on the periodicity p and a size (for example, time period) of the transmission window 304. The SPS parameters may also indicate a parameter K1 that specifies an uplink occasion (for example, uplink grant time), in terms of time slots, for transmitting feedback (for example, an ACK or a NACK) after an SPS occasion 302A and 302B. Specifically, the parameter K1 indicates a number of time slots between respective SPS occasion 302A and 302B and an associated uplink occasion 306. The UE may perform an uplink transmission on an uplink channel, such as a physical uplink control channel (PUCCH), during the uplink occasions 306.

As shown in the example 300 of FIG. 3A, because the transmission window 304 corresponds to a low traffic period, a number of empty SPS occasions 302B (for example, four empty SPS occasions 302B) may be greater than a number of non-empty SPS occasions 302A (for example, two non-empty SPS occasions 302A). The non-empty SPS occasions 302A may also be referred to as non-skipped SPS occasions and the empty SPS occasions 302B may also be referred to as skipped SPS occasions. The base station may refrain from transmitting downlink data during an empty SPS occasion 302B. In a typical wireless communication system, for a NACK-only feedback scheme based on the example 300, the UE may transmit four NACKs, where each respective NACK corresponds to an empty SPS occasion 302B. Each NACK may be transmitted via uplink resources specified for an uplink occasion 306 associated with an empty SPS occasion 302B.

In the example 300 of FIG. 3A, the UE may transmit more NACKs (for example, four NACKs) in the NACK-only scheme than ACKs (for example, two ACKS) in an ACK-only scheme. Accordingly, for the NACK-only scheme, based on the example 300 of FIG. 3A, network overhead may increase, based on an increase in a number of NACK transmissions, in comparison to network overhead for an ACK-only scheme.

Figure 3B:
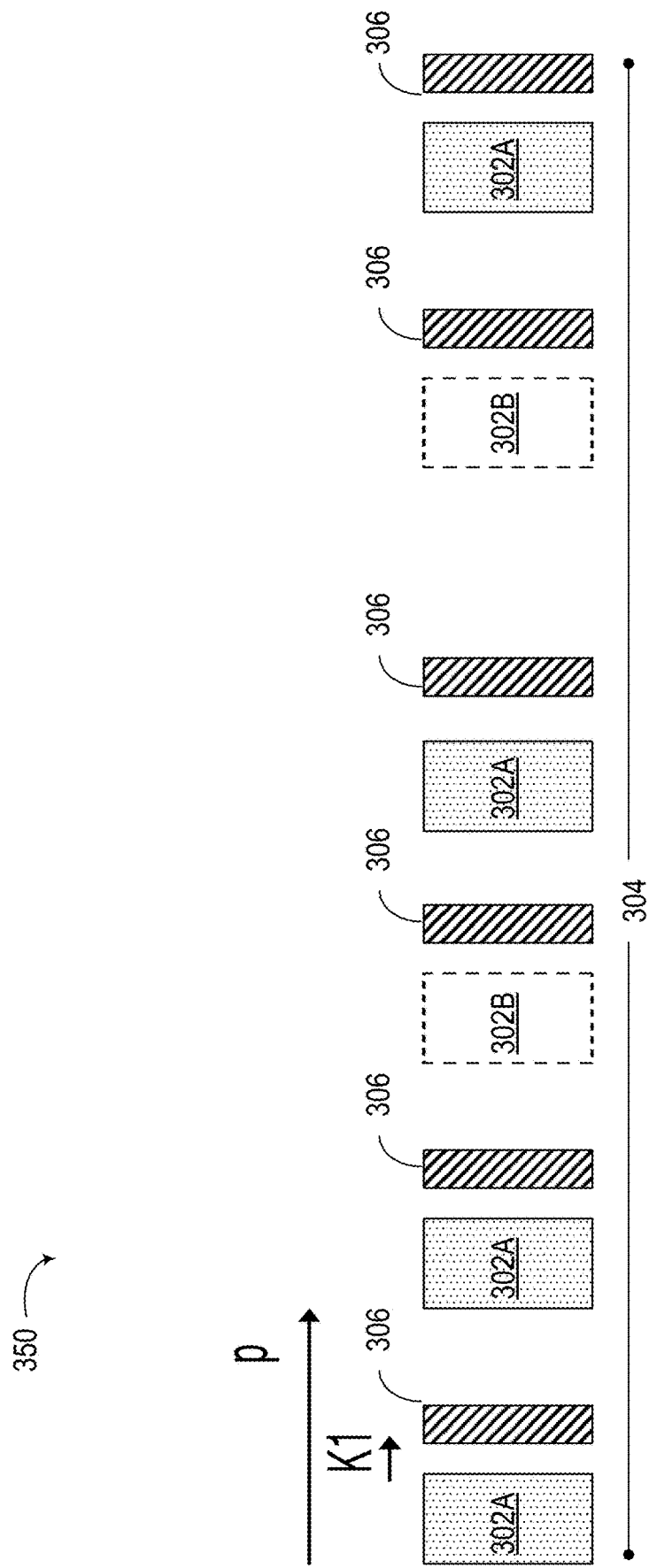
FIG. 3B is a block diagram illustrating an example of SPS transmission occasions during a high traffic period.

FIG. 3B is a block diagram illustrating an example 350 of SPS transmission occasions 302A and 302B during a high traffic period. In FIG. 3B, the process for configuring the SPS transmission occasions 302A and 302B is the same as described with respect FIG. 3A. For brevity, description of the operations for configuring the SPS transmission occasions 302A and 302B of FIG. 3B is omitted.

As shown in the example 350 of FIG. 3B, because the transmission window 304 corresponds to a high traffic period, a number of empty SPS occasions 302B (for example, two empty SPS occasions 302B) may be less than a number of non-empty SPS occasions 302A (for example, four non-empty SPS occasions 302A). In a typical wireless communication system, for a NACK-only feedback scheme based on the example 350, the UE may transmit two NACKs. Thus, in the example 350 of FIG. 3B, the UE may transmit fewer NACKs (for example, two NACKs) in the NACK-only scheme than ACKs (for example, four ACKS) in an ACK-only scheme. Accordingly, for the NACK-only scheme, based on the example 350 of FIG. 3B, network overhead may decrease, based on a decrease in a number of NACK transmissions, in comparison to network overhead for an ACK-only scheme or an ACK-NACK scheme.

As shown in the example 300 of FIG. 3A, the NACK-only scheme may increase network overhead if a number of empty SPS occasions 302B is greater than a number of non-empty SPS occasions 302A. Therefore, it may be desirable to reduce network overhead for the NACK-only scheme. Various aspects disclosed relate generally to indicating a number of empty SPS transmission occasions in an SPS scheme. Some aspects more specifically relate to selectively transmitting an indication of a number of NACKs associated with a group of SPS transmissions based on the indicated number of SPS transmission occasions.

In some examples, a base station may indicate, to a UE, a number of empty SPS occasions from a total number of SPS occasions within a transmission window prior to transmitting data in non-empty SPS occasions. In such examples, the UE may check a number of NACKs associated with all SPS occasions within the transmission window prior to transmitting the NACKs. The NACKs may include NACKs associated with the empty SPS occasions. Additionally, in some examples, the NACKs may also include NACKs associated with failed SPS transmissions, such as SPS transmissions that failed due to a blocked beam. In some examples, the UE may refrain from transmitting feedback on an uplink control channel if the number of NACKs equal the number of empty SPS occasions. In such examples, the UE reduces a number of feedback packets by refraining from transmitting the feedback, thereby reducing network overhead.

Additionally, in some examples, the UE may determine its ability to decode SPS transmissions based on the indication of the number of empty SPS occasions. In such examples, the UE may determine an ACK probability based on the indication of the number of empty SPS occasions. Furthermore, in some examples, the UE may identify a blocked beam or transmission outage based on the indication of the number of empty SPS occasions. In such examples, the UE may distinguish between an empty SPS occasion due to an outage (for example, a blocked beam) and an empty SPS occasion due to discontinuous transmission (for example, a configured empty SPS occasion). In some examples, the UE may report empty SPS occasions due to the outage and request additional new beams or an improved connection with the base station.

Figure 4:
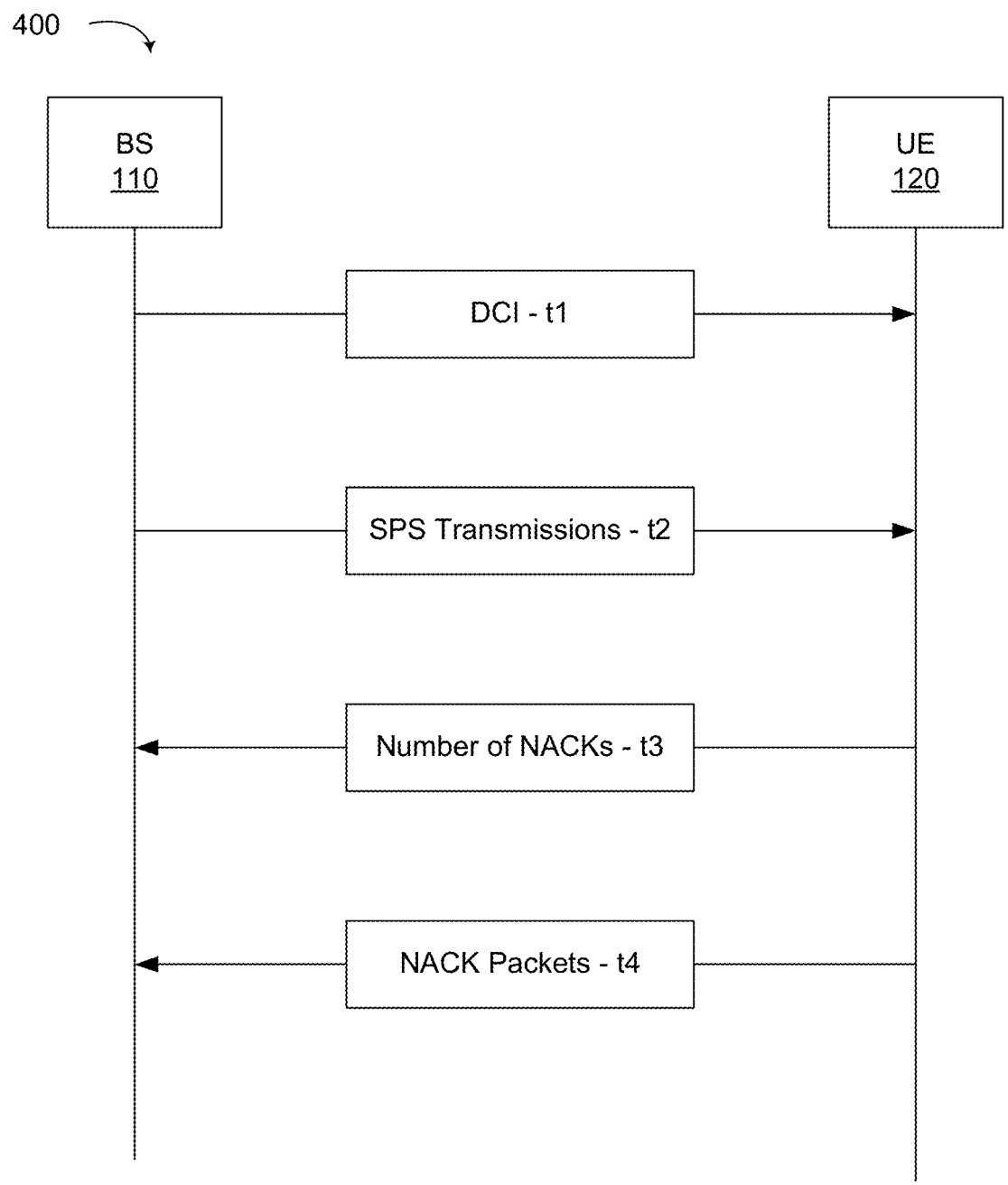
FIG. 4 is a timing diagram illustrating an example of selectively transmitting negative acknowledgments (NACKs) based on an indication of a number of empty SPS occasions, in accordance with aspects of the present disclosure.

FIG. 4 is a timing diagram illustrating an example 400 of selectively transmitting NACKs based on an indication of a number of empty SPS occasions, in accordance with aspects of the present disclosure. As shown in FIG. 4, at time t1, the base station 110 may transmit DCI to the UE 120. The DCI may be an activation DCI or a reactivation DCI. For the case of the reactivation DCI, the base station 110 may have transmitted an activation DCI to the UE 120 prior to time t1. As discussed, the DCI may indicate one or more SPS parameters, such as a parameter K1. A periodicity p may be configured via RRC signaling. In some examples, the DCI may also indicate both a semi-persistent schedule for SPS occasions, such as PDSCH occasions, within a transmission window and a number of a first group of empty SPS occasions. A length of the transmission window may be configured via RRC signaling. In the example 400 of FIG. 4, the SPS occasions may include the first group of empty SPS occasions and a second group of non-empty SPS occasions, such as the empty SPS occasions 302B and the non-empty SPS occasions 302A discussed with reference to FIGS. 3A and 3B. In some examples, the DCI indicates an expected number of empty SPS occasions based on traffic statistics. The empty SPS occasions may be empty PDSCH occasions (for example empty SPS PDSCH occasions), where the base station 110 does not transmit downlink data to a receiving device, such as the UE 120. The empty SPS occasions may also be referred to as skipped SPS occasions (for example, skipped SPS PDSCH occasions).

Upon receiving the DCI, the UE 120 may begin to monitor for SPS transmissions in the non-empty SPS occasions indicated by the DCI. At time t2, the UE 120 receives SPS transmissions, such as downlink data transmissions, within the transmission window based on the semi-persistent schedule indicated by the DCI at time t1. Each downlink data transmission corresponds to a respective non-empty SPS occasion of the second group of non-empty SPS occasions.

In some examples, the UE 120 may be capable of distinguishing between an expected empty SPS occasion and a failed transmission (for example, an SPS occasion that is empty based on an outage, such as a blocked beam). The UE 120 may distinguish between the expected empty SPS occasions and the failed transmission based on reference signals, such as demodulation reference signals (DMRS), a decoding margin method, or other techniques. In some such examples, the UE 120 may indicate, to the base station 110, whether it is capable of distinguishing between the expected empty SPS occasions and the failed transmission. In some such examples, based on its capability to distinguish between the expected empty SPS occasions and the failed transmission, the UE 120 may count a number of NACKs associated with the SPS occasions indicated in the DCI (time t1).

In such examples, the UE 120 may selectively indicate the number of NACKs to the base station 110 at time t3. In some examples, the UE 120 refrains from indicating a number of NACKs and also refrains from transmitting the NACKs (for example, the NACK packets) to the base station 110 (time t4) if a total number of NACKs equals the number of the first group of empty SPS occasions. In some other examples, the UE 120 indicates a number of NACKs to the base station 110, at time t3, if a total number of NACKs is greater than the number of the first group of empty SPS occasions. The total number of NACKs may be based on a total number of NACKs associated with empty SPS occasions and a total number of NACKs associated with non-empty SPS occasions. A NACK associated with a non-empty SPS occasion may be generated based on a failed transmission, such as a transmission that failed due to beam blockage. In some examples, the number indicated at time t3 may be a number of NACKs associated with the non-empty SPS occasions, a number of NACKs associated with the empty SPS occasions, or the total number of NACKs.

Additionally, in some examples, in addition to indicating the number of NACKs, at time t3, the UE 120 may also indicate a location of each NACK associated with the number of NACKs. In some examples, the location of each NACK is associated with a respective location in a bitmap. In some other examples, the location of each NACK is associated with either a location (for example, time slot) of a non-empty SPS occasion or an empty SPS occasion. The UE 120 may indicate each location as a location in the bitmap based on a number of bits used for transmitting the bitmap being less than the number of bits used for indicating a location corresponding to a non-empty SPS occasion or an empty SPS occasion. In some examples, the UE 120 indications the location, for each NACK, corresponding to the non-empty SPS occasion or the empty SPS occasion if the following function is satisfied $k*ceil(\log 2(M)) \leq M$, where the parameter k represents a number of NACKs and M represents a number of SPS occasions within the transmission window. The ceil( ) function rounds a value up to a next largest integer. In one such example, the number of SPS occasions (M) may be eight, such that $\log 2(8)=3$ bits. In this example, $k \leq floor(M/ceil(\log 2(M))=floor(8/3)=2$, such that the UE 120 may indicate the location, for each NACK, corresponding to the non-empty SPS occasion or the empty SPS occasion if a number of NACKs (k) is equal to one or two. Alternatively, in this example, the UE 120 may indicate each location as a location in the bitmap if the number of NACKs (k) is equal or greater than two. In some examples, the UE 120 may indicate, a priori, to the base station 110 whether the location of each NACK is associated with a location in a bitmap, or one of the non-empty SPS occasions or the empty SPS occasions.

In some other examples, if the UE 120 cannot distinguish between the expected empty SPS occasions and the failed transmission, the UE 120 may report an ACK and a NACK for each SPS occasion, at time t3, unless the total number of NACKs equals the number of the first group of empty SPS occasions. As shown in FIG. 4, at time t4, the UE 120 may transmit the NACK packets associated with the total number of NACKs. The NACK packets may be transmitted in a same feedback message used to indicate the number of NACKs (time t3).

In some examples, the number of NACKs indicated at time t3 may be a quantized number of NACKs. In some such examples, the base station 110 may transmit a message indicating a number of bits for quantizing the number of NACKs. In some examples, the number of bits for quantizing the number of NACKs is equal to a number of SPS occasions within a transmission window. In one such example, if eight SPS occasions are defined within the transmission window, the number of bits for quantizing the number of NACKs may be eight. In some other examples, the base station 110 may indicate a range for the number of NACKs to reduce a feedback size. Each range may be associated with a different quantization value. As an example, two bits may be allocated for the quantization. In this example, NACKs in a first range may be quantized to "00", NACKs in a second range may be quantized to "01", and NACKS in a third range may be quantized to "10". Each range may correspond to SPS occasion locations. The range and the number of quantization bits may be defined by the base station 110 or standardized. In some other examples, the range and the number of quantization bits may be suggested by the UE 120 and accepted by the base station 110.

In some examples, after transmitting the number of NACKs (time t3) and the NACK packets (time t4), the UE 120 may transmit additional reports. Additionally, or alternatively, the UE 120 may request new beams or request another connection with the base station 110. Additionally, or alternatively, the base station 110 may request additional reporting based on receiving the number of NACKs (time t3) and the NACK packets (time t4). In some examples, the base station 110 may configure new beams or adjust the connection with the UE 120 based on receiving the number of NACKs (time t3) and the NACK packets (time t4).

Aspects of the present disclosure are not limited to SPS downlink transmissions. In some implementations, the SPS is specified for uplink transmissions, such as uplink configured grants. In such examples, the UE 120 may indicate a number of empty uplink configured grant occasions to the base station 110. The base station 110 may then selectively transmit NACKS to the UE 120 based on the indicated number of empty uplink configured grant occasions. In some examples, the base station 110 may indicate a number of NACKs based on a total number of NACKs being greater than the number of empty uplink configured grant occasions.

In some other implementations, the SPS is specified for sidelink (SL) transmissions, such as type 1 or type 2 SL configured grants. In such examples, the UE 120 may indicate a number of empty SL configured grant occasions to an SL device. The SL device may then selectively transmit NACKs to the UE 120 based on the indicated number of empty SL configured grant occasions. In some examples, the SL device may indicate a number of NACKs based on a total number of NACKs being greater than the number of empty SL configured grant occasions.

Figure 5:
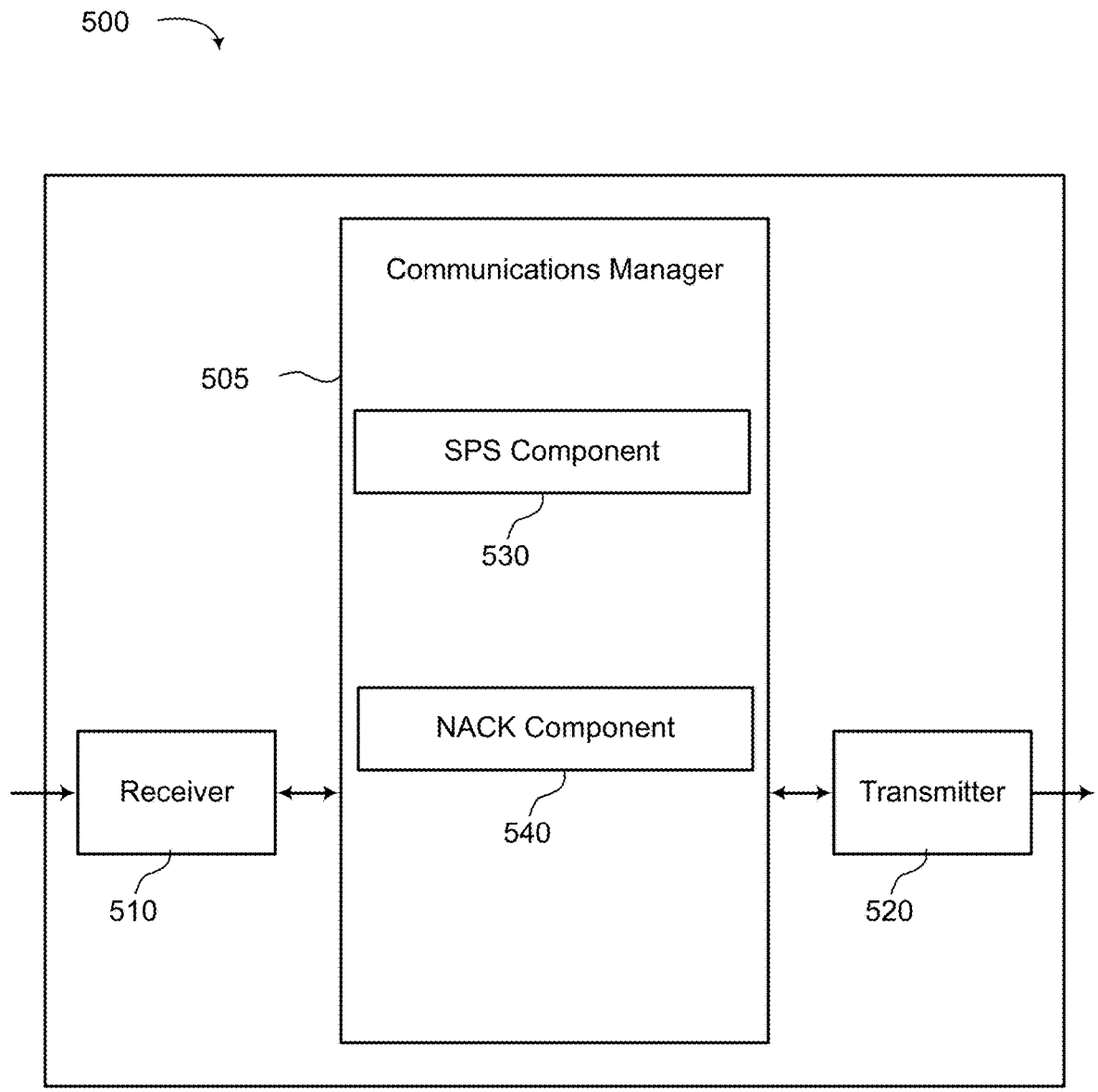
FIG. 5 is a block diagram illustrating an example wireless communication device that supports selectively transmitting NACKs, in accordance with some aspects of the present disclosure.

FIG. 5 is a block diagram illustrating an example wireless communication device that supports non-coherent communication associated with polar coding in accordance with some aspects of the present disclosure. The device 500 may be an example of aspects of a UE 120 or base station 110 described with reference to FIG. 1. The wireless communications device 500 may include a receiver 510, a communications manager 505, a transmitter 520, an SPS component 530, and a NACK component 540, which may be in communication with one another (for example, via one or more buses). In some examples, the wireless communications device 500 is configured to perform operations, including operations of the process 600 described below with reference to FIG. 6.

In some examples, the wireless communications device 500 can include a chip, chipset, package, or device that includes at least one processor and at least one modem (for example, a 5G modem or other cellular modem). In some examples, the communications manager 505, or its sub-components, may be separate and distinct components. In some examples, at least some components of the communications manager 505 are implemented at least in part as software stored in a memory. For example, portions of one or more of the components of the communications manager 505 can be implemented as non-transitory code executable by the processor to perform the functions or operations of the respective component.

The receiver 510 may receive one or more of reference signals (for example, periodically configured channel state information reference signals (CSI-RSs), aperiodically configured CSI-RSs, or multi-beam-specific reference signals), synchronization signals (for example, synchronization signal blocks (SSBs)), control information and data information, such as in the form of packets, from one or more other wireless communications devices via various channels including control channels (for example, a physical downlink control channel (PDCCH) or physical uplink control channel (PUCCH)) and data channels (for example, a physical downlink shared channel (PDSCH) or a physical uplink shared channel (PUSCH)). The other wireless communications devices may include, but are not limited to, a base station 110 or UE 120 described with reference to FIG. 1.

The received information may be passed on to other components of the device 500. The receiver 510 may be an example of aspects of the receive processor 238, 258 described with reference to FIG. 2. The receiver 510 may include a set of radio frequency (RF) chains that are coupled with or otherwise utilize a set of antennas (for example, the set of antennas may be an example of aspects of the antennas 252a, 234a through 252r, 234t described with reference to FIG. 2).

The transmitter 520 may transmit signals generated by the communications manager 505 or other components of the wireless communications device 500. In some examples, the transmitter 520 may be collocated with the receiver 510 in a transceiver. The transmitter 520 may be an example of aspects of the transmit processor 220, 264 described with reference to FIG. 2. The transmitter 520 may be coupled with or otherwise utilize a set of antennas (for example, the set of antennas may be an example of aspects of the antennas 252a, 234a through 252r, 234t described with reference to FIG. 2), which may be antenna elements shared with the receiver 510. In some examples, the transmitter 520 is configured to transmit control information in a PUCCH or PDCCH and data in a physical uplink shared channel (PUSCH) or PDSCH.

The communications manager 505 may be an example of aspects of the controller/processor 240, 280 described with reference to FIG. 2. The communications manager 505 may include the SPS component 530 and the NACK component 540. In some implementations, the SPS component 530 may work in conjunction with the receiver 510 to receive, from a base station, DCI indicating both a semi-persistent schedule for PDSCH occasions within a transmission window and a first quantity of a first group of empty PDSCH occasions. The PDSCH occasions may include the first group of empty PDSCH occasions and a second group of non-empty PDSCH occasions. Working in conjunction with the receiver 510, the SPS component 530 may also receive, from the base station, downlink data transmissions within the transmission window based on the semi-persistent schedule. Each downlink data transmission of the downlink data transmissions may be received in a respective non-empty PDSCH occasion of the second group of non-empty PDSCH occasions. Additionally, working in conjunction with the transmitter 520 and the SPS component 530, the NACK component 540 may transmit, to the base station after the transmission window, a feedback message indicating a second quantity of either a first group of NACKs associated with the first group of empty PDSCH occasions or a second group of NACKs associated with the second group of non-empty PDSCH occasions based on a total quantity of both the first group of NACKs and the second group of NACKs being greater than the first quantity. Furthermore, working in conjunction with the transmitter 520 and the SPS component 530, the NACK component 540 may transmit, to the base station after the transmission window, each NACK of one or both of the first group of NACKs or the second group of NACKs.

Figure 6:
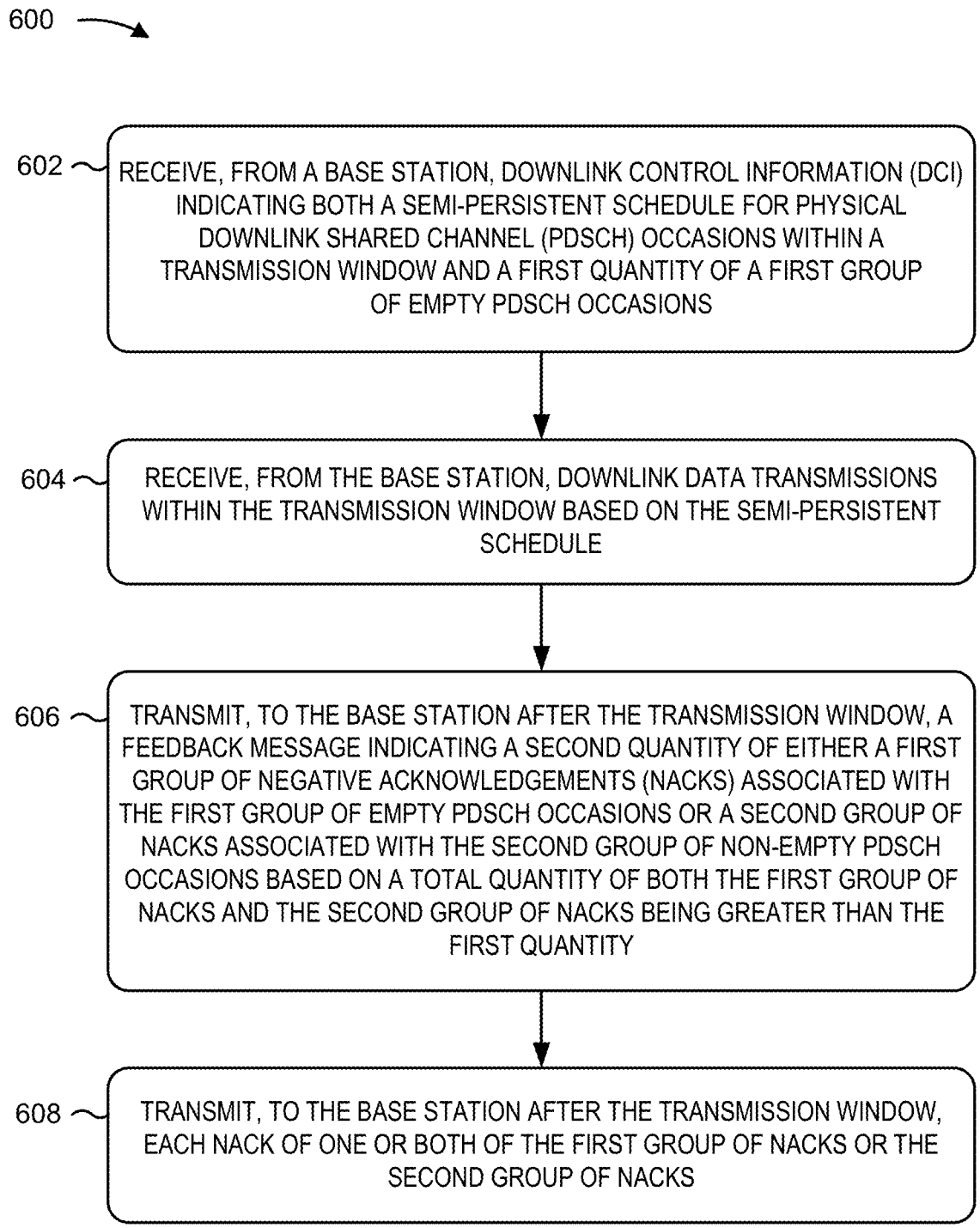
FIG. 6 is a flow diagram illustrating an example process performed by a UE, in accordance with some aspects of the present disclosure.

FIG. 6 is a flow diagram illustrating an example process 600 performed by a UE, in accordance with some aspects of the present disclosure. The UE may be an example of a UE 120 described with reference to FIGS. 1, 2, and 4. The example process 600 is an example of selective transmitting NACKs in a NACK-only feedback scheme. As shown in FIG. 6, the process 600 begins at block 602 by receiving, from a base station, DCI indicating both a semi-persistent schedule for a number of PDSCH occasions within a transmission window and a first quantity of a first group of empty PDSCH occasions. The number of PDSCH occasions may include the first group of empty PDSCH occasions and a second group of non-empty PDSCH occasions. At block 604, the process 600 receives, from the base station, a number of downlink data transmissions within the transmission window based on the semi-persistent schedule. Each downlink data transmission of the number of downlink data transmissions may be received in a respective non-empty PDSCH occasion of the second group of non-empty PDSCH occasions. At block 606, the process 600 transmits, to the base station after the transmission window, a feedback message indicating a second quantity of either a first group of NACKs associated with the first group of empty PDSCH occasions or a second group of NACKs associated with the second group of non-empty PDSCH occasions based on a total quantity of both the first group of NACKs and the second group of NACKs being greater than the first quantity. At block 608, the process 600 transmits, to the base station after the transmission window, each NACK of one or both of the first group of NACKs or the second group of NACKs.

Figure 7:
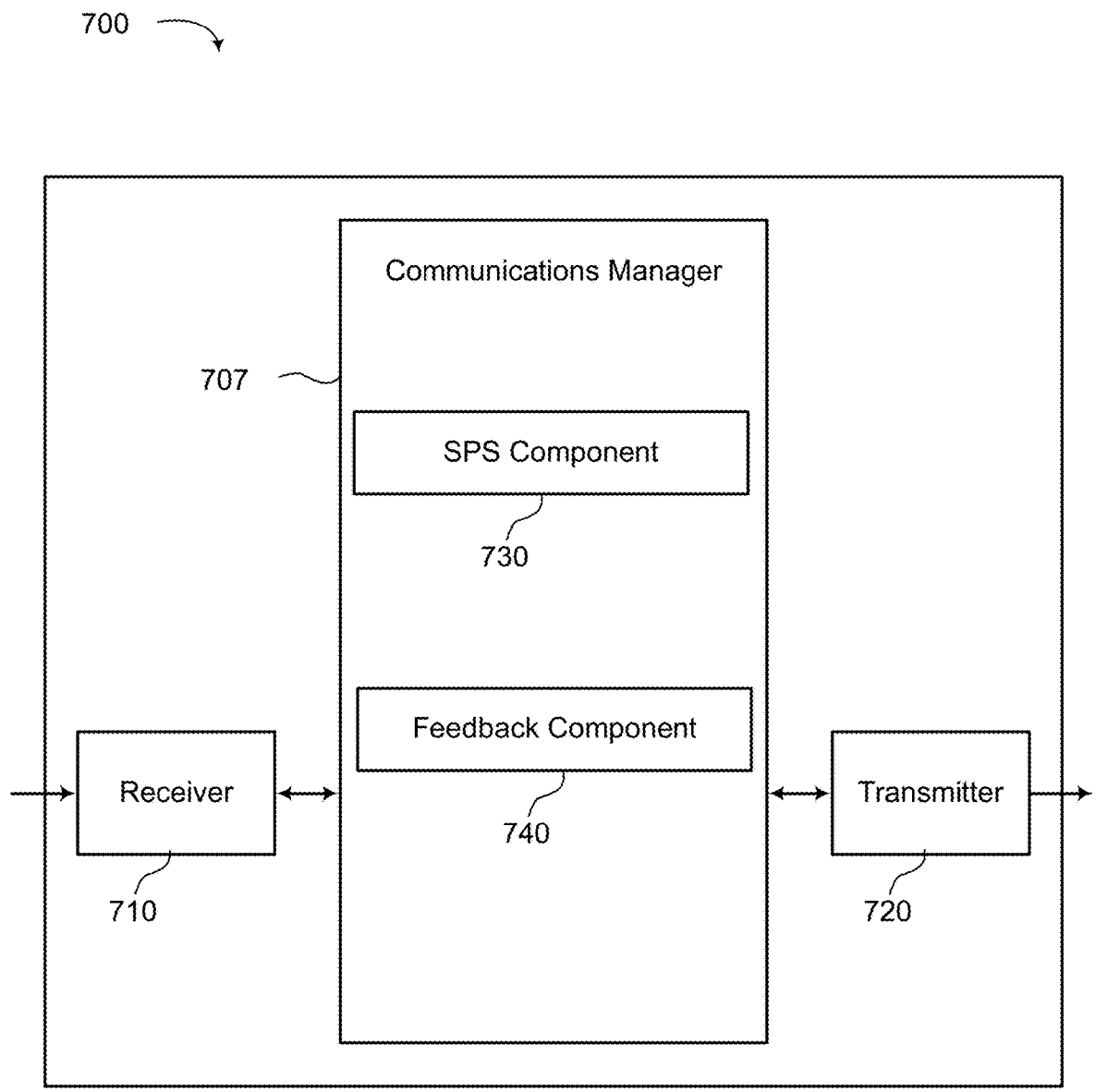
FIG. 7 is a block diagram illustrating an example wireless communication device that supports selectively transmitting NACKs, in accordance with some aspects of the present disclosure.

FIG. 7 is a block diagram illustrating an example wireless communication device 700 that supports selectively transmitting NACKs, in accordance with aspects of the present disclosure. The wireless communication device 700 may be an example of aspects of a base station 110 described with reference to FIGS. 1, 2, and 4. The wireless communication device 700 may include a receiver 710, a communications manager 715, and a transmitter 720, which may be in communication with one another (for example, via one or more buses). In some examples, the wireless communication device 700 is configured to perform operations, including operations of the process 800 described below with reference to FIG. 8.

In some examples, the wireless communication device 700 can include a chip, system on chip (SOC), chipset, package, or device that includes at least one processor and at least one modem (for example, a 5G modem or other cellular modem). In some examples, the communications manager 715, or its sub-components, may be separate and distinct components. In some examples, at least some components of the communications manager 715 are implemented at least in part as software stored in a memory. For example, portions of one or more of the components of the communications manager 715 can be implemented as non-transitory code executable by the processor to perform the functions or operations of the respective component.

The receiver 710 may receive one or more reference signals (for example, periodically configured CSI-RSs, aperiodically configured CSI-RSs, or multi-beam-specific reference signals), synchronization signals (for example, synchronization signal blocks (SSBs)), control information, and/or data information, such as in the form of packets, from one or more other wireless communication devices via various channels including control channels (for example, a PDCCH) and data channels (for example, a PDSCH). The other wireless communication devices may include, but are not limited to, another base station 110 or a UE 120, described with reference to FIGS. 1 and 2.

The received information may be passed on to other components of the wireless communication device 700. The receiver 710 may be an example of aspects of the receive processor 238 described with reference to FIG. 2. The receiver 710 may include a set of radio frequency (RF) chains that are coupled with or otherwise utilize a set of antennas (for example, the set of antennas may be an example of aspects of the antennas 234*a* through 234*t* described with reference to FIG. 2).

The transmitter 720 may transmit signals generated by the communications manager 715 or other components of the wireless communication device 700. In some examples, the transmitter 720 may be collocated with the receiver 710 in a transceiver. The transmitter 720 may be an example of aspects of the transmit processor 220 described with reference to FIG. 2. The transmitter 720 may be coupled with or otherwise utilize a set of antennas (for example, the set of antennas may be an example of aspects of the antennas 234*a* through 234*t*), which may be antenna elements shared with the receiver 710. In some examples, the transmitter 720 is configured to transmit control information in a physical uplink control channel (PUCCH) and data in a physical uplink shared channel (PUSCH).

The communications manager 715 may be an example of aspects of the controller/processor 240 described with reference to FIG. 2. The communications manager 715 includes an SPS component 730 and a feedback component 740. Working in conjunction with the receiver 710, the SPS component 730 may receive, from a second wireless device, a transmission configuration message configuring transmission occasions from the first wireless device to the second wireless device within a transmission window. Additionally, working in conjunction with the transmitter 720, the SPS component 730 may transmit, to the second wireless device, a transmission occasion message indicating a first quantity of a first group of empty transmission occasions of the transmission occasions that include the first group of empty transmission occasions and a second group of non-empty transmission occasions. Furthermore, working in conjunction with the transmitter 720, the SPS component 730 may transmit, to the second wireless device, transmissions within the transmission window. Each transmission may be transmitted in a respective non-empty transmission occasion of the second group of non-empty transmission occasions. Working in conjunction with the receiver 710 and the SPS component 730, the feedback component 740 receives, from the second wireless device after the transmission window, a feedback message indicating a second quantity of either a first group of NACKs associated with the first group of empty PDSCH occasions or a second group of NACKs associated with the second group of non-empty PDSCH occasions based on a total quantity of both the first group of NACKs and the second group of NACKs being greater than the first quantity. Furthermore, working in conjunction with the receiver 710 and the SPS component 730, the feedback component 740 receives, from the second wireless device, each NACK of one or both of the first group of NACKs or the second group of NACKs.

Figure 8:
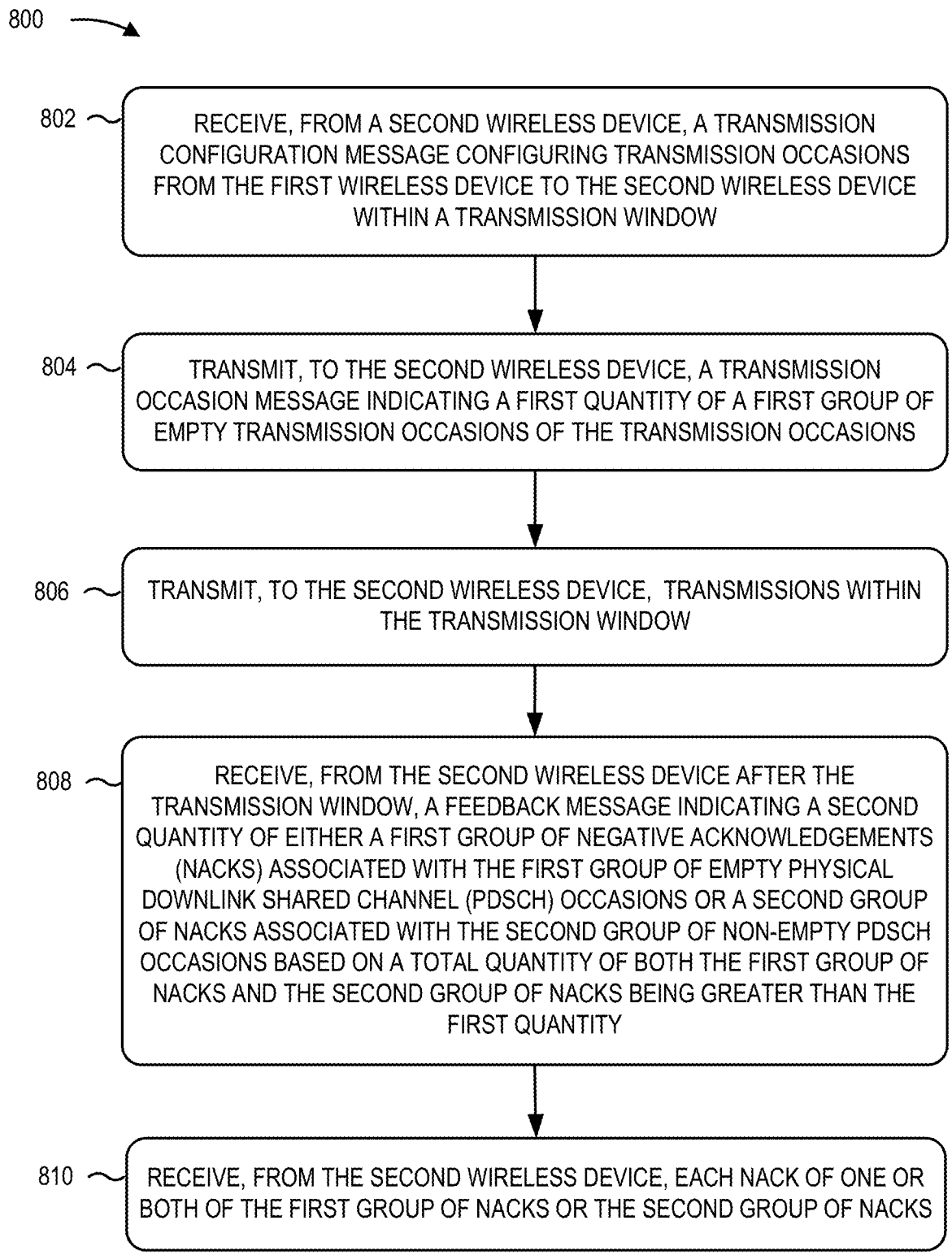
FIG. 8 is a flow diagram illustrating an example process performed by a wireless device, in accordance with some aspects of the present disclosure.

FIG. 8 is a flow diagram illustrating an example of a process 800 performed by a first wireless device, in accordance with some aspects of the present disclosure. The first wireless device may be an example of a base station, such as a base station 110 described with reference to FIGS. 1, 2, and 4, or a UE, such as a UE 120 described with reference to FIGS. 1, 2, and 4. The example process 800 is an example of selective transmitting NACKs in a NACK-only feedback scheme. As shown in FIG. 8, the process 800 begins at block 802, by receiving, from a second wireless device, a transmission configuration message configuring transmission occasions from the first wireless device to the second wireless device within a transmission window. At block 804, the process 800 transmits, to the second wireless device, a transmission occasion message indicating a first quantity of a first group of empty transmission occasions of the transmission occasions that include the first group of empty transmission occasions and a second group of non-empty transmission occasions. At block 806, the process 800 transmits, to the second wireless device, transmissions within the transmission window. Each transmission may be transmitted in a respective non-empty transmission occasion of the second group of non-empty transmission occasions. At block 808, the process 800 receives, from the second wireless device after the transmission window, a feedback message indicating a second quantity of either a first group of NACKs associated with the first group of empty PDSCH occasions or a second group of NACKs associated with the second group of non-empty PDSCH occasions based on a total quantity of both the first group of NACKs and the second group of NACKs being greater than the first quantity. At block 810, the process 800 receives, from the second wireless device, each NACK of one or both of the first group of NACKs or the second group of NACKs.

Implementation examples are described in the following numbered clauses:

Clause 1. A method for wireless communication by a UE, comprising: receiving, from a base station, DCI indicating both a semi-persistent schedule for a plurality of PDSCH occasions within a transmission window and a first quantity of a first group of empty PDSCH occasions, the plurality of PDSCH occasions comprising the first group of empty PDSCH occasions and a second group of non-empty PDSCH occasions; receiving, from the base station, a plurality of downlink data transmissions within the transmission window based on the semi-persistent schedule, each downlink data transmission of the plurality of downlink data transmissions being received in a respective non-empty PDSCH occasion of the second group of non-empty PDSCH occasions; transmitting, to the base station after the transmission window, a feedback message indicating a second quantity of either a first group of NACKs associated with the first group of empty PDSCH occasions or a second group of NACKs associated with the second group of non-empty PDSCH occasions based on a total quantity of both the first group of NACKs and the second group of NACKs being greater than the first quantity; and transmitting, to the base station after the transmission window, each NACK of one or both of the first group of NACKs or the second group of NACKs.

Clause 2. The method of Clause 1, wherein: the feedback message indicates the second quantity of the first group of NACKs; and the feedback message further indicates a location of each NACK in the first group of NACKs as a respective location in a bitmap.

Clause 3. The method of Clause 1, wherein: the feedback message indicates the second quantity of the first group of NACKs; and the feedback message further indicates a location of each NACK in the first group of NACKs corresponding to a location of a respective empty PDSCH occasion in the first group of empty PDSCH occasions.

Clause 4. The method of Clause 1, wherein: the feedback message indicates the second quantity of the second group of NACKs; and the feedback message further indicates a location of each NACK in the second group of NACKs as a respective location in a bitmap.

Clause 5. The method of Clause 1, wherein: the feedback message indicates the second quantity of the second group of NACKs; and the feedback message further indicates a location of each NACK in the second group of NACKs corresponding to a location of a respective non-empty PDSCH occasion in the second group of non-empty PDSCH occasions.

Clause 6. The method of any one of Clauses 1-5, further comprising transmitting, to the base station, a message indicating a capability to distinguish between an empty PDSCH occasion and a PDSCH occasion associated with a blocked downlink beam, the feedback message indicating the second quantity is transmitted based on transmitting the message indicating the capability.

Clause 7. The method of any one of Clauses 1-6, further comprising: receiving, from the base station, a message indicating a quantity of bits for the feedback message; and quantizing a value associated with the second quantity based on the quantity of bits, wherein the feedback message indicates the quantized value associated with the second quantity.

Clause 8. A method for wireless communication by a first wireless device, comprising: receiving, from a second wireless device, a transmission configuration message configuring a plurality of transmission occasions from the first wireless device to the second wireless device within a transmission window; transmitting, to the second wireless device, a transmission occasion message indicating a first quantity of a first group of empty transmission occasions of the plurality of transmission occasions, the plurality of transmission occasions comprising the first group of empty transmission occasions and a second group of non-empty transmission occasions; transmitting, to the second wireless device, a plurality of transmissions within the transmission window, each transmission of the plurality of transmissions being transmitted in a respective non-empty transmission occasion of the second group of non-empty transmission occasions; and receiving, from the second wireless device after the transmission window, a feedback message indicating a second quantity of either a first group of NACKs associated with the first group of empty PDSCH occasions or a second group of NACKs associated with the second group of non-empty PDSCH occasions based on a total quantity of both the first group of NACKs and the second group of NACKs being greater than the first quantity; receiving, from the second wireless device, each NACK of one or both of the first group of NACKs or the second group of NACKs.

Clause 9. The method of Clause 8, wherein: the feedback message indicates the second quantity of the first group of NACKs; and the feedback message further indicates a location of each NACK in the first group of NACKs as a respective location in a bitmap.

Clause 10. The method of Clause 8, wherein: the feedback message indicates the second quantity of the first group of NACKs; and the feedback message further indicates a location of each NACK in the first group of NACKs corresponding to a location of a respective empty PDSCH occasion in the first group of empty PDSCH occasions.

Clause 11. The method of Clause 8, wherein: the feedback message indicates the second quantity of the second group of NACKs; and the feedback message further indicates a location of each NACK in the second group of NACKs as a respective location in a bitmap.

Clause 12. The method of Clause 8, wherein: the feedback message indicates the second quantity of the second group of NACKs; and the feedback message further indicates a location of each NACK in the second group of NACKs corresponding to a location of a respective non-empty PDSCH occasion in the second group of non-empty PDSCH occasions.

Clause 13. The method of Clause 8, further comprising receiving, from the second wireless device, a message indicating a capability to distinguish between an empty transmission occasion and a transmission occasion associated with a blocked transmission beam.

Clause 14. The method of any one of Clauses 8-13, further comprising transmitting, to the second wireless device, a message indicating a first quantity of bits for the feedback message, wherein the feedback message indicates a quantized value associated with the second quantity, a second quantity of bits allocated to the quantized value being equal to the first quantity of bits.

Clause 15. The method of any one of Clauses 8-14, wherein: the first wireless device is a UE; the second wireless device is a base station; each transmission of the plurality of transmissions is an uplink transmission; and each transmission occasion of the plurality of transmission occasions is an uplink configured grant transmission occasion.

Clause 16. The method of any one of Clauses 8-14, wherein: the first wireless device is a first sidelink UE; the second wireless device is a second sidelink UE; each transmission of the plurality of transmissions is a sidelink transmission; and each transmission occasion of the plurality of transmission occasions is a sidelink transmission occasion.

The foregoing disclosure provides illustration and description, but is not intended to be exhaustive or to limit the aspects to the precise form disclosed. Modifications and variations may be made in light of the above disclosure or may be acquired from practice of the aspects.

As used, the term "component" is intended to be broadly construed as hardware, firmware, and/or a combination of hardware and software. As used, a processor is implemented in hardware, firmware, and/or a combination of hardware and software.

Some aspects are described in connection with thresholds. As used, satisfying a threshold may, depending on the context, refer to a value being greater than the threshold, greater than or equal to the threshold, less than the threshold, less than or equal to the threshold, equal to the threshold, not equal to the threshold, and/or the like.

It will be apparent that systems and/or methods described may be implemented in different forms of hardware, firmware, and/or a combination of hardware and software. The actual specialized control hardware or software code used to implement these systems and/or methods is not limiting of the aspects. Thus, the operation and behavior of the systems and/or methods were described without reference to specific software code—it being understood that software and hardware can be designed to implement the systems and/or methods based, at least in part, on the description.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (for example, a-a, a-a-a, a-a-b, a-a-c, a-b-b, a-c-c, b-b, b-b-b, b-b-c, c-c, and c-c-c or any other ordering of a, b, and c).

No element, act, or instruction used should be construed as critical or essential unless explicitly described as such. Also, as used, the articles "a" and "an" are intended to include one or more items, and may be used interchangeably with "one or more." Furthermore, as used, the terms "set" and "group" are intended to include one or more items (for example, related items, unrelated items, a combination of related and unrelated items, and/or the like), and may be used interchangeably with "one or more." Where only one item is intended, the phrase "only one" or similar language is used. Also, as used, the terms "has," "have," "having," and/or the like are intended to be open-ended terms. Further, the phrase "based on" is intended to mean "based, at least in part, on" unless explicitly stated otherwise.

As used, "or" is used intended to be interpreted in the inclusive sense, unless otherwise explicitly indicated. For example, "a or b" may include a only, b only, or a combination of a and b. As used, a phrase referring to "at least one of" or "one or more of" a list of items refers to any combination of those items, including single members. For example, "at least one of: a, b, or c" is intended to cover the examples of: a only, b only, c only, a combination of a and b, a combination of a and c, a combination of b and c, and a combination of a and b and c.

What is claimed is:

1. A method for wireless communication by a user equipment (UE), comprising:
   receiving, from a network entity, downlink control information (DCI) indicating both a semi-persistent schedule for a plurality of physical downlink shared channel (PDSCH) occasions within a transmission window and a first quantity of empty PDSCH occasions included in a first group of empty PDSCH occasions, each empty PDSCH occasion of the first group of empty PDSCH occasions being a respective PDSCH occasion of the plurality of PDSCH occasions that lacks data, the plurality of PDSCH occasions also comprising a second group of non-empty PDSCH occasions;
   receiving, from the network entity, a plurality of downlink data transmissions within the transmission window based on the semi-persistent schedule, each downlink data transmission of the plurality of downlink data transmissions being received in a respective non-empty PDSCH occasion of the second group of non-empty PDSCH occasions;
   transmitting, to the network entity after the transmission window, a feedback message indicating a second quantity of either a first group of negative acknowledgements (NACKs) associated with the first group of empty PDSCH occasions or a second group of NACKs associated with the second group of non-empty PDSCH occasions based on a total quantity of both the first group of NACKs and the second group of NACKs being greater than the first quantity; and
   transmitting, to the network entity after the transmission window, each NACK of one or both of the first group of NACKs or the second group of NACKs.

2. The method of claim 1, wherein:
   the feedback message indicates the second quantity of the first group of NACKs; and
   the feedback message further indicates a location of each NACK in the first group of NACKs as a respective location in a bitmap.

3. The method of claim 1, wherein:
   the feedback message indicates the second quantity of the first group of NACKs; and
   the feedback message further indicates a location of each NACK in the first group of NACKs corresponding to a location of a respective empty PDSCH occasion in the first group of empty PDSCH occasions.

4. The method of claim 1, wherein:
   the feedback message indicates the second quantity of the second group of NACKs; and
   the feedback message further indicates a location of each NACK in the second group of NACKs as a respective location in a bitmap.

5. The method of claim 1, wherein:
   the feedback message indicates the second quantity of the second group of NACKs; and
   the feedback message further indicates a location of each NACK in the second group of NACKs corresponding to a location of a respective non-empty PDSCH occasion in the second group of non-empty PDSCH occasions.

6. The method of claim 1, further comprising transmitting, to the network entity, a capability message indicating a capability to distinguish between an empty PDSCH occasion and a PDSCH occasion associated with a blocked downlink beam, the feedback message indicating the second quantity is transmitted based on transmitting the message indicating the capability.

7. The method of claim 1, further comprising:
   receiving, from the network entity, a configuration message indicating a quantity of bits for the feedback message; and
   quantizing a value associated with the second quantity based on the quantity of bits,
   wherein the feedback message indicates the quantized value associated with the second quantity.

8. An apparatus for wireless communications at a user equipment (UE), comprising:
   at least one processor;
   at least one memory coupled with the at least one processor; and
   instructions stored in the at least one memory and operable, when executed by the at least one processor, to cause the apparatus to:

receive, from a network entity, downlink control information (DCI) indicating both a semi-persistent schedule for a plurality of physical downlink shared channel (PDSCH) occasions within a transmission window and a first quantity of empty PDSCH occasions included in a first group of empty PDSCH occasions, each empty PDSCH occasion of the first group of empty PDSCH occasions being a respective PDSCH occasion of the plurality of PDSCH occasions that lacks data, the plurality of PDSCH occasions also comprising a second group of non-empty PDSCH occasions;

receive, from the network entity, a plurality of downlink data transmissions within the transmission window based on the semi-persistent schedule, each downlink data transmission of the plurality of downlink data transmissions being received in a respective non-empty PDSCH occasion of the second group of non-empty PDSCH occasions;

transmit, to the network entity after the transmission window, a feedback message indicating a second quantity of either a first group of negative acknowledgements (NACKs) associated with the first group of empty PDSCH occasions or a second group of NACKs associated with the second group of non-empty PDSCH occasions based on a total quantity of both the first group of NACKs and the second group of NACKs being greater than the first quantity; and transmit, to the network entity after the transmission window, each NACK of one or both of the first group of NACKs or the second group of NACKs.

9. The apparatus of claim 8, wherein:
the feedback message indicates the second quantity of the first group of NACKs; and
the feedback message further indicates a location of each NACK in the first group of NACKs as a respective location in a bitmap.

10. The apparatus of claim 8, wherein:
the feedback message indicates the second quantity of the first group of NACKs; and
the feedback message further indicates a location of each NACK in the first group of NACKs corresponding to a location of a respective empty PDSCH occasion in the first group of empty PDSCH occasions.

11. The apparatus of claim 8, wherein:
the feedback message indicates the second quantity of the second group of NACKs; and
the feedback message further indicates a location of each NACK in the second group of NACKs as a respective location in a bitmap.

12. The apparatus of claim 8, wherein:
the feedback message indicates the second quantity of the second group of NACKs; and
the feedback message further indicates a location of each NACK in the second group of NACKs corresponding to a location of a respective non-empty PDSCH occasion in the second group of non-empty PDSCH occasions.

13. The apparatus of claim 8, wherein execution of the instructions further cause the apparatus to transmit, to the network entity, a capability message indicating a capability to distinguish between an empty PDSCH occasion and a PDSCH occasion associated with a blocked downlink beam, the feedback message indicating the second quantity is transmitted based on transmitting the message indicating the capability.

14. The apparatus of claim 8, wherein execution of the instructions further cause the apparatus to:
receive, from the network entity, a configuration message indicating a quantity of bits for the feedback message; and
quantize a value associated with the second quantity based on the quantity of bits,
wherein the feedback message indicates the quantized value associated with the second quantity.

15. A method for wireless communication by a first wireless device, comprising:
receiving, from a second wireless device, a transmission configuration message configuring a plurality of transmission occasions from the first wireless device to the second wireless device within a transmission window;

transmitting, to the second wireless device, a transmission occasion message indicating a first quantity of a first group of empty transmission occasions of the plurality of transmission occasions, the plurality of transmission occasions comprising the first group of empty transmission occasions and a second group of non-empty transmission occasions;

transmitting, to the second wireless device, a plurality of transmissions within the transmission window, each transmission of the plurality of transmissions being transmitted in a respective non-empty transmission occasion of the second group of non-empty transmission occasions; and receiving, from the second wireless device after the transmission window, a feedback message indicating a second quantity of either a first group of negative acknowledgements (NACKs) associated with the first group of empty physical downlink shared channel (PDSCH) occasions or a second group of NACKs associated with the second group of non-empty PDSCH occasions based on a total quantity of both the first group of NACKs and the second group of NACKs being greater than the first quantity, each empty PDSCH occasion of the first group of empty PDSCH occasions being a respective PDSCH occasion of the plurality of transmission occasions that lacks data, the plurality of transmission occasions also comprising the second group of non-empty PDSCH occasions;

receiving, from the second wireless device, each NACK of one or both of the first group of NACKs or the second group of NACKs.

16. The method of claim 15, wherein:
the feedback message indicates the second quantity of the first group of NACKs; and
the feedback message further indicates a location of each NACK in the first group of NACKs as a respective location in a bitmap.

17. The method of claim 15, wherein:
the feedback message indicates the second quantity of the first group of NACKs; and
the feedback message further indicates a location of each NACK in the first group of NACKs corresponding to a location of a respective empty PDSCH occasion in the first group of empty PDSCH occasions.

18. The method of claim 15, wherein:
the feedback message indicates the second quantity of the second group of NACKs; and
the feedback message further indicates a location of each NACK in the second group of NACKs as a respective location in a bitmap.

19. The method of claim 15, wherein:
the feedback message indicates the second quantity of the second group of NACKs; and
the feedback message further indicates a location of each NACK in the second group of NACKs corresponding to a location of a respective non-empty PDSCH occasion in the second group of non-empty PDSCH occasions.

20. The method of claim 15, further comprising receiving, from the second wireless device, a capability message indicating a capability to distinguish between an empty transmission occasion and a transmission occasion associated with a blocked transmission beam.

21. The method of claim 15, further comprising transmitting, to the second wireless device, a configuration message indicating a first quantity of bits for the feedback message,
wherein the feedback message indicates a quantized value associated with the second quantity, a second quantity of bits allocated to the quantized value being equal to the first quantity of bits.

22. The method of claim 15, wherein:
the first wireless device is a user equipment (UE);
the second wireless device is a network entity;
each transmission of the plurality of transmissions is an uplink transmission; and
each transmission occasion of the plurality of transmission occasions is an uplink configured grant transmission occasion.

23. The method of claim 15, wherein:
the first wireless device is a first sidelink user equipment (UE);
the second wireless device is a second sidelink UE;
each transmission of the plurality of transmissions is a sidelink transmission; and
each transmission occasion of the plurality of transmission occasions is a sidelink transmission occasion.

24. An apparatus for wireless communications at a first wireless device, comprising:
at least one processor;
at least one memory coupled with the processor; and
instructions stored in the at least one memory and operable, when executed by the at least one processor, to cause the apparatus to:
receive, from a second wireless device, a transmission configuration message configuring a plurality of transmission occasions from the first wireless device to the second wireless device within a transmission window;
transmit, to the second wireless device, a transmission occasion message indicating a first quantity of a first group of empty transmission occasions of the plurality of transmission occasions, the plurality of transmission occasions comprising the first group of empty transmission occasions and a second group of non-empty transmission occasions;
transmit, to the second wireless device, a plurality of transmissions within the transmission window, each transmission of the plurality of transmissions being transmitted in a respective non-empty transmission occasion of the second group of non-empty transmission occasions; and
receive, from the second wireless device after the transmission window, a feedback message indicating a second quantity of either a first group of negative acknowledgements (NACKs) associated with the first group of empty physical downlink shared channel (PDSCH) occasions or a second group of NACKs associated with the second group of non-empty PDSCH occasions based on a total quantity of both the first group of NACKs and the second group of NACKs being greater than the first quantity, each empty PDSCH occasion of the first group of empty PDSCH occasions being a respective PDSCH occasion of the plurality of transmission occasions that lacks data, the plurality of transmission occasions also comprising the second group of non-empty PDSCH occasions;
receive, from the second wireless device, each NACK of one or both of the first group of NACKs or the second group of NACKs.

25. The apparatus of claim 24, wherein:
the feedback message indicates the second quantity of the first group of NACKs; and
the feedback message further indicates a location of each NACK in the first group of NACKs as a respective location in a bitmap.

26. The apparatus of claim 24, wherein:
the feedback message indicates the second quantity of the first group of NACKs; and
the feedback message further indicates a location of each NACK in the first group of NACKs corresponding to a location of a respective empty PDSCH occasion in the first group of empty PDSCH occasions.

27. The apparatus of claim 24, wherein:
the feedback message indicates the second quantity of the second group of NACKs; and
the feedback message further indicates a location of each NACK in the second group of NACKs as a respective location in a bitmap.

28. The apparatus of claim 24, wherein:
the feedback message indicates the second quantity of the second group of NACKs; and
the feedback message further indicates a location of each NACK in the second group of NACKs corresponding to a location of a respective non-empty PDSCH occasion in the second group of non-empty PDSCH occasions.

29. The apparatus of claim 24, wherein:
the first wireless device is a user equipment (UE);
the second wireless device is a network entity;
each transmission of the plurality of transmissions is an uplink transmission; and
each transmission occasion of the plurality of transmission occasions is an uplink configured grant transmission occasion.

30. The apparatus of claim 24, wherein:
the first wireless device is a first sidelink user equipment (UE);
the second wireless device is a second sidelink UE;
each transmission of the plurality of transmissions is a sidelink transmission; and
each transmission occasion of the plurality of transmission occasions is a sidelink transmission occasion.

* * * * *